United States Patent
Ngo et al.

(10) Patent No.: US 8,726,331 B2
(45) Date of Patent: *May 13, 2014

(54) SYSTEM AND METHOD FOR THE BROADCAST DISSEMINATION OF TIME-ORDERED DATA

(75) Inventors: J. Thomas Ngo, Palo Alto, CA (US); Steven E. Saunders, Cupertino, CA (US); Owen Rubin, Oakland, CA (US)

(73) Assignee: Interval Licensing LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,519

(22) Filed: Sep. 14, 2012

(65) Prior Publication Data

US 2013/0086276 A1    Apr. 4, 2013

Related U.S. Application Data

(60) Division of application No. 13/235,740, filed on Sep. 19, 2011, now Pat. No. 8,341,688, which is a division of application No. 12/388,557, filed on Feb. 19, 2009, now Pat. No. 8,046,818, which is a continuation of application No. 11/106,173, filed on Apr. 13, 2005, now Pat. No. 7,565,681, which is a continuation of application No. 09/414,514, filed on Oct. 8, 1999, now Pat. No. 7,155,735.

(51) Int. Cl.
*H04N 7/173* (2011.01)
*H04N 7/16* (2011.01)

(52) U.S. Cl.
USPC ........... 725/135; 725/101; 725/104; 725/136; 725/86

(58) Field of Classification Search
USPC ............................ 725/86, 101, 135–136, 104
See application file for complete search history.

(56) References Cited

U.S. PATENT DOCUMENTS

| | | |
|---|---|---|
| 3,884,403 A | 5/1975 | Brewer |
| 3,919,475 A | 11/1975 | Dukich et al. |
| 4,033,335 A | 7/1977 | Nickles |
| 4,033,488 A | 7/1977 | Brewer |
| 4,051,534 A | 9/1977 | Dukich et al. |

(Continued)

FOREIGN PATENT DOCUMENTS

| | | |
|---|---|---|
| DE | 4408131 | 7/1995 |
| EP | 179701 | 4/1986 |

(Continued)

OTHER PUBLICATIONS

U.S. Appl. No. 13/568,219, filed Aug. 7, 2012, Bhadkamkar et al.

(Continued)

*Primary Examiner* — An Son P Huynh
(74) *Attorney, Agent, or Firm* — Perkins Coie LLP

(57) ABSTRACT

A stream of time-ordered data, such as a movie, is divided into multiple fragments of equal length, which are repetitively transmitted at different respective repetition rates. The fragments are reordered for transmission so that those which occur near the beginning of the original data stream are transmitted more frequently than those which occur later in the data stream. When a user enters a request to utilize the data, the individual fragments are stored upon receipt at the user's premises, and reassembled into a contiguous stream. The ordering of the fragments is such that the wait time required before utilization of the data can begin is limited to a predetermined maximum, and at least one copy of every fragment becomes available by the time it is needed.

15 Claims, 8 Drawing Sheets

(56) References Cited

U.S. PATENT DOCUMENTS

| | | |
|---|---|---|
| 4,131,919 A | 12/1978 | Lloyd et al. |
| 4,217,609 A | 8/1980 | Hatori et al. |
| 4,260,229 A | 4/1981 | Bloomstein |
| 4,283,735 A | 8/1981 | Jagger |
| 4,319,286 A | 3/1982 | Hanpachern |
| 4,390,904 A | 6/1983 | Johnston et al. |
| 4,446,997 A | 5/1984 | Himberg |
| 4,520,404 A | 5/1985 | Von Kohorn |
| 4,524,381 A | 6/1985 | Konishi |
| 4,526,308 A | 7/1985 | Dovey |
| 4,527,201 A | 7/1985 | Cappels |
| 4,536,066 A | 8/1985 | Bauer |
| 4,574,354 A | 3/1986 | Mihalik et al. |
| 4,602,297 A | 7/1986 | Reese |
| 4,605,964 A | 8/1986 | Chard |
| 4,605,973 A | 8/1986 | Von Kohorn |
| 4,618,895 A | 10/1986 | Wright |
| 4,714,184 A | 12/1987 | Young et al. |
| 4,739,398 A | 4/1988 | Thomas et al. |
| 4,750,052 A | 6/1988 | Poppy et al. |
| 4,750,053 A | 6/1988 | Allen |
| 4,777,537 A | 10/1988 | Ueno et al. |
| 4,782,401 A | 11/1988 | Faerber et al. |
| 4,814,876 A | 3/1989 | Horio et al. |
| 4,827,532 A | 5/1989 | Bloomstein |
| 4,837,817 A | 6/1989 | Maemori et al. |
| 4,841,575 A | 6/1989 | Welsh et al. |
| 4,843,484 A | 6/1989 | Kanamaru et al. |
| 4,847,543 A | 7/1989 | Fellinger |
| 4,913,539 A | 4/1990 | Lewis |
| 4,930,160 A | 5/1990 | Vogel et al. |
| 4,934,821 A | 6/1990 | Morton |
| 4,965,825 A | 10/1990 | Harvey et al. |
| 4,989,104 A | 1/1991 | Schulein et al. |
| 5,012,334 A | 4/1991 | Etra |
| 5,012,335 A | 4/1991 | Cohodar |
| 5,025,394 A | 6/1991 | Parke |
| 5,038,217 A | 8/1991 | Hayashi et al. |
| 5,040,081 A | 8/1991 | McCutchen |
| 5,109,482 A | 4/1992 | Bohrman |
| 5,136,655 A | 8/1992 | Bronson |
| 5,146,353 A | 9/1992 | Isoguchi et al. |
| 5,157,742 A | 10/1992 | Niihara et al. |
| 5,172,281 A | 12/1992 | Ardis et al. |
| 5,175,769 A | 12/1992 | Hejna, Jr. et al. |
| 5,177,796 A | 1/1993 | Feig et al. |
| 5,179,449 A | 1/1993 | Doi et al. |
| 5,182,641 A | 1/1993 | Diner et al. |
| 5,185,667 A | 2/1993 | Zimmermann |
| 5,187,571 A | 2/1993 | Braun et al. |
| 5,226,093 A | 7/1993 | Iwase et al. |
| 5,233,654 A | 8/1993 | Harvey et al. |
| 5,239,428 A | 8/1993 | Nishida et al. |
| 5,241,428 A | 8/1993 | Goldwasser et al. |
| 5,249,289 A | 9/1993 | Thamm et al. |
| 5,253,061 A | 10/1993 | Takahama et al. |
| 5,253,066 A | 10/1993 | Vogel |
| 5,253,275 A | 10/1993 | Yurt et al. |
| 5,262,856 A | 11/1993 | Lippman et al. |
| 5,265,180 A | 11/1993 | Golin |
| 5,267,042 A | 11/1993 | Tsuchiya et al. |
| 5,295,089 A | 3/1994 | Ambasz |
| 5,299,019 A | 3/1994 | Pack et al. |
| 5,305,400 A | 4/1994 | Butera et al. |
| 5,317,730 A | 5/1994 | Moore et al. |
| 5,329,320 A | 7/1994 | Yifrach |
| 5,333,091 A | 7/1994 | Iggulden et al. |
| 5,343,251 A | 8/1994 | Nafeh |
| 5,377,051 A | 12/1994 | Lane et al. |
| 5,384,703 A | 1/1995 | Withgott et al. |
| 5,396,287 A | 3/1995 | Cho |
| 5,396,583 A | 3/1995 | Chen et al. |
| 5,404,316 A | 4/1995 | Klingler et al. |
| 5,406,626 A | 4/1995 | Ryan |
| 5,416,310 A | 5/1995 | Little |
| 5,420,801 A | 5/1995 | Dockter et al. |
| 5,421,031 A | 5/1995 | De Bey et al. |
| 5,428,774 A | 6/1995 | Takahashi et al. |
| 5,430,835 A | 7/1995 | Williams et al. |
| 5,436,542 A | 7/1995 | Petelin et al. |
| 5,436,653 A | 7/1995 | Ellis et al. |
| 5,438,357 A | 8/1995 | McNelley |
| 5,438,362 A | 8/1995 | Tabuchi et al. |
| 5,438,423 A | 8/1995 | Lynch et al. |
| 5,444,478 A | 8/1995 | Lelong et al. |
| 5,467,271 A | 11/1995 | Abel et al. |
| 5,467,288 A | 11/1995 | Fasciano et al. |
| 5,473,379 A | 12/1995 | Horne |
| 5,477,331 A | 12/1995 | Yamaguchi et al. |
| 5,486,852 A | 1/1996 | Arai et al. |
| 5,488,409 A | 1/1996 | Yuen et al. |
| 5,510,830 A | 4/1996 | Ohia et al. |
| 5,514,861 A | 5/1996 | Swartz et al. |
| 5,524,051 A | 6/1996 | Ryan |
| 5,524,193 A | 6/1996 | Covington et al. |
| 5,528,282 A | 6/1996 | Voeten et al. |
| 5,537,151 A | 7/1996 | Orr et al. |
| 5,537,530 A | 7/1996 | Edgar et al. |
| 5,539,483 A | 7/1996 | Nalwa |
| 5,546,145 A | 8/1996 | Bernardi et al. |
| 5,550,754 A | 8/1996 | McNelley et al. |
| 5,555,463 A | 9/1996 | Staron |
| 5,572,261 A | 11/1996 | Cooper |
| 5,575,443 A | 11/1996 | Honeycutt |
| 5,583,565 A | 12/1996 | Cortjens et al. |
| 5,583,571 A | 12/1996 | Friedland |
| 5,583,652 A | 12/1996 | Ware |
| 5,590,195 A | 12/1996 | Ryan |
| 5,592,626 A | 1/1997 | Papadimitriou et al. |
| 5,594,498 A | 1/1997 | Fraley |
| 5,598,352 A | 1/1997 | Rosenau et al. |
| 5,604,551 A | 2/1997 | Choi et al. |
| 5,606,359 A | 2/1997 | Youden et al. |
| 5,608,839 A | 3/1997 | Chen |
| 5,612,742 A | 3/1997 | Krause et al. |
| 5,613,032 A | 3/1997 | Cruz et al. |
| 5,613,909 A | 3/1997 | Stelovsky |
| 5,614,940 A | 3/1997 | Cobbley et al. |
| 5,623,173 A | 4/1997 | Fasullo et al. |
| 5,635,982 A | 6/1997 | Zhang et al. |
| 5,664,227 A | 9/1997 | Mauldin et al. |
| 5,666,159 A | 9/1997 | Parulski et al. |
| 5,671,014 A | 9/1997 | Ito et al. |
| 5,678,793 A | 10/1997 | Hill |
| 5,682,597 A | 10/1997 | Ganek et al. |
| 5,684,514 A | 11/1997 | Branscomb |
| 5,687,095 A | 11/1997 | Haskell et al. |
| 5,689,300 A | 11/1997 | Shibata et al. |
| 5,689,648 A | 11/1997 | Diaz et al. |
| 5,692,213 A | 11/1997 | Goldberg et al. |
| 5,692,661 A | 12/1997 | Kellerman |
| 5,694,474 A | 12/1997 | Ngo et al. |
| 5,701,582 A | 12/1997 | DeBey et al. |
| 5,703,655 A | 12/1997 | Corey et al. |
| 5,703,795 A | 12/1997 | Mankovitz |
| 5,713,021 A | 1/1998 | Kondo et al. |
| 5,717,814 A | 2/1998 | Abecassis |
| 5,717,869 A | 2/1998 | Moran et al. |
| 5,721,823 A | 2/1998 | Chen et al. |
| 5,724,646 A | 3/1998 | Ganek et al. |
| 5,726,660 A | 3/1998 | Purdy et al. |
| 5,726,717 A | 3/1998 | Peters et al. |
| 5,729,108 A | 3/1998 | Steele et al. |
| 5,729,741 A | 3/1998 | Liaguno et al. |
| 5,737,009 A | 4/1998 | Payton |
| 5,740,037 A | 4/1998 | McCann et al. |
| 5,742,339 A | 4/1998 | Wakui et al. |
| 5,742,517 A | 4/1998 | Van Den Bosch |
| 5,749,010 A | 5/1998 | McCumber |
| 5,751,336 A | 5/1998 | Aggarwal et al. |
| 5,751,806 A | 5/1998 | Ryan |
| 5,752,113 A | 5/1998 | Borden |
| 5,754,230 A | 5/1998 | Tsuruta et al. |
| 5,758,181 A | 5/1998 | Becker |

(56) References Cited

U.S. PATENT DOCUMENTS

| | | |
|---|---|---|
| 5,765,133 A | 6/1998 | Antoniol et al. |
| 5,768,640 A | 6/1998 | Takahashi et al. |
| 5,768,648 A | 6/1998 | Skipp et al. |
| 5,774,498 A | 6/1998 | Oya et al. |
| 5,774,664 A | 6/1998 | Hidary et al. |
| 5,778,181 A | 7/1998 | Hidary et al. |
| 5,791,907 A | 8/1998 | Ramshaw et al. |
| 5,793,367 A | 8/1998 | Taguchi et al. |
| 5,793,971 A | 8/1998 | Fujita et al. |
| 5,796,426 A | 8/1998 | Gullichsen et al. |
| 5,805,156 A | 9/1998 | Richmond et al. |
| 5,809,161 A | 9/1998 | Auty et al. |
| 5,818,439 A | 10/1998 | Nagasaka et al. |
| 5,818,510 A | 10/1998 | Cobbley et al. |
| 5,822,493 A | 10/1998 | Uehara et al. |
| 5,826,206 A | 10/1998 | Nemeth |
| 5,828,994 A | 10/1998 | Covell et al. |
| 5,831,662 A | 11/1998 | Payton |
| 5,835,667 A | 11/1998 | Wactlar et al. |
| 5,838,874 A | 11/1998 | Ng et al. |
| 5,844,693 A | 12/1998 | Miyata et al. |
| 5,870,143 A | 2/1999 | Suzuki et al. |
| 5,880,788 A | 3/1999 | Bregler |
| 5,884,141 A | 3/1999 | Inoue et al. |
| 5,886,739 A | 3/1999 | Winningstad |
| 5,892,536 A | 4/1999 | Logan et al. |
| 5,893,062 A | 4/1999 | Bhadkamkar et al. |
| 5,917,542 A | 6/1999 | Moghadam et al. |
| 5,926,205 A | 7/1999 | Krause et al. |
| 5,929,904 A | 7/1999 | Uchida et al. |
| 5,936,659 A | 8/1999 | Viswanathan et al. |
| 5,940,004 A | 8/1999 | Fulton |
| 5,946,050 A | 8/1999 | Wolff |
| 5,974,235 A | 10/1999 | Nunally et al. |
| 5,982,979 A | 11/1999 | Omata et al. |
| 5,999,173 A | 12/1999 | Ubillos |
| 6,005,564 A | 12/1999 | Ahmad et al. |
| 6,009,204 A | 12/1999 | Ahmad |
| 6,018,359 A | 1/2000 | Kermode et al. |
| 6,020,883 A | 2/2000 | Herz et al. |
| 6,025,837 A | 2/2000 | Matthews, III et al. |
| 6,041,142 A | 3/2000 | Rao et al. |
| 6,061,055 A | 5/2000 | Marks |
| 6,061,056 A | 5/2000 | Menard et al. |
| 6,069,621 A | 5/2000 | Schupak |
| 6,072,542 A | 6/2000 | Wilcox et al. |
| 6,081,551 A | 6/2000 | Etoh |
| 6,118,925 A | 9/2000 | Murata et al. |
| 6,141,693 A | 10/2000 | Perlman et al. |
| 6,160,950 A | 12/2000 | Shimazaki et al. |
| 6,172,675 B1 | 1/2001 | Ahmad et al. |
| 6,212,657 B1 | 4/2001 | Wang et al. |
| 6,236,395 B1 | 5/2001 | Sezan et al. |
| 6,240,555 B1 | 5/2001 | Shoff et al. |
| 6,243,725 B1 | 6/2001 | Hempleman et al. |
| 6,259,817 B1 | 7/2001 | Ahmad |
| 6,263,507 B1 | 7/2001 | Ahmad et al. |
| 6,266,085 B1 | 7/2001 | Kato et al. |
| 6,272,231 B1 | 8/2001 | Maurer et al. |
| 6,282,362 B1 | 8/2001 | Murphy et al. |
| 6,297,845 B1 | 10/2001 | Kuhn et al. |
| 6,351,599 B1 | 2/2002 | Komeno et al. |
| 6,360,202 B1 | 3/2002 | Bhadkamkar et al. |
| 6,360,234 B2 | 3/2002 | Jain et al. |
| 6,366,296 B1 | 4/2002 | Boreczky et al. |
| 6,377,519 B1 | 4/2002 | Lee et al. |
| 6,385,386 B1 | 5/2002 | Aotake |
| 6,404,811 B1 | 6/2002 | Cvetko et al. |
| 6,452,969 B1 | 9/2002 | Yim |
| 6,502,139 B1 | 12/2002 | Birk et al. |
| 6,563,532 B1 | 5/2003 | Strub et al. |
| 6,598,228 B2 | 7/2003 | Hejna, Jr. |
| 6,622,305 B1 | 9/2003 | Willard |
| 6,624,846 B1 | 9/2003 | Lassiter |
| 6,690,273 B2 | 2/2004 | Thomason |
| 6,701,528 B1 | 3/2004 | Arsenault et al. |
| 6,704,750 B2 | 3/2004 | Asazu et al. |
| 6,728,678 B2 | 4/2004 | Bhadkamkar et al. |
| 6,782,186 B1 | 8/2004 | Covell et al. |
| 6,825,875 B1 | 11/2004 | Strub et al. |
| 6,859,839 B1 | 2/2005 | Zahorjan et al. |
| 6,868,452 B1 | 3/2005 | Eager et al. |
| 6,880,171 B1 | 4/2005 | Ahmad et al. |
| 6,901,209 B1 | 5/2005 | Cooper et al. |
| 6,934,461 B1 | 8/2005 | Strub et al. |
| 6,961,954 B1 | 11/2005 | Maybury et al. |
| 6,986,156 B1 | 1/2006 | Rodriguez et al. |
| 6,993,787 B1 | 1/2006 | Kamel et al. |
| 7,003,533 B2 | 2/2006 | Noguchi et al. |
| 7,024,678 B2 | 4/2006 | Gordon et al. |
| 7,055,103 B2 | 5/2006 | Lif |
| 7,072,575 B2 | 7/2006 | Kang et al. |
| 7,111,316 B1 | 9/2006 | Zahorjan et al. |
| 7,130,528 B2 | 10/2006 | Blair et al. |
| 7,143,431 B1 | 11/2006 | Eager et al. |
| 7,155,735 B1 | 12/2006 | Ngo et al. |
| 7,194,186 B1 | 3/2007 | Strub et al. |
| 7,266,771 B1 | 9/2007 | Tow et al. |
| 7,340,760 B2 | 3/2008 | Wachtfogel et al. |
| 7,352,813 B2 | 4/2008 | Kim |
| 7,454,777 B1 | 11/2008 | Nishikawa et al. |
| 7,480,446 B2 | 1/2009 | Bhadkamkar et al. |
| 7,519,271 B2 | 4/2009 | Strub et al. |
| 7,565,681 B2 | 7/2009 | Ngo et al. |
| 8,046,818 B2 | 10/2011 | Ngo et al. |
| 2002/0006266 A1 | 1/2002 | Yoon et al. |
| 2002/0031331 A1 | 3/2002 | Kwoh et al. |
| 2002/0120925 A1 | 8/2002 | Logan |
| 2002/0157103 A1 | 10/2002 | Song et al. |
| 2002/0159750 A1 | 10/2002 | Jasinschi et al. |
| 2002/0170068 A1 | 11/2002 | Rafey et al. |
| 2003/0093790 A1 | 5/2003 | Logan et al. |
| 2003/0149574 A1 | 8/2003 | Rudman |
| 2004/0078812 A1 | 4/2004 | Calvert |
| 2004/0123324 A1 | 6/2004 | Sazzad et al. |
| 2004/0170385 A1 | 9/2004 | Bhadkamkar et al. |
| 2006/0031879 A1 | 2/2006 | Colter et al. |
| 2006/0031885 A1 | 2/2006 | Colter et al. |
| 2006/0031916 A1 | 2/2006 | Colter et al. |
| 2006/0053470 A1 | 3/2006 | Colter et al. |
| 2007/0204319 A1 | 8/2007 | Ahmad et al. |
| 2008/0127240 A1 | 5/2008 | Covell et al. |
| 2009/0097823 A1 | 4/2009 | Bhadkamkar et al. |
| 2009/0276817 A1 | 11/2009 | Colter et al. |
| 2011/0055861 A1 | 3/2011 | Covell et al. |

FOREIGN PATENT DOCUMENTS

| | | |
|---|---|---|
| EP | 0295148 | 12/1988 |
| EP | 0513601 | 11/1992 |
| EP | 0673107 A2 | 9/1995 |
| EP | 0674315 A1 | 9/1995 |
| EP | 0681398 A2 | 11/1995 |
| EP | 0689362 A2 | 12/1995 |
| EP | 0700203 | 3/1996 |
| EP | 0713331 | 5/1996 |
| EP | 0713334 | 5/1996 |
| EP | 0737005 | 10/1996 |
| GB | 2231246 | 11/1990 |
| JP | 117419 | 7/1989 |
| JP | 06162166 | 6/1994 |
| WO | WO-96/12270 | 4/1996 |
| WO | WO-9612240 | 4/1996 |
| WO | WO-9715926 | 5/1997 |

OTHER PUBLICATIONS

"About Gitzo," http//www.gitzo.com/en/company.htm, Gitzo S.A. Ball Head Camera Mounts, 4 pgs.

"Correlating Audio and Moving-Image Tracks," IBM Technical Disclosure Bulletin, vol. 33, No. 10A, Mar. 1991, pp. 295-296.

"Covert Video/Audio Sunglasses," From Rock House Products, http://www.rock2000.com/nanny/glasses.htm, Dec. 9, 1998, 2 pages.

(56) References Cited

OTHER PUBLICATIONS

"Evolution of Steve Mann's 'existential computer' ('wearable computer') invention developed for applications in 'personal imaging'", IEEE Computer Society, 1998, 1 page.
"Informedia: Experience on Demand," DARPA/ITO Joint IC and V/IM Principal Investigator Meeting, Oct. 15-17, 1997.
"VideoLogger® SDK: Virage Open Architecture," Datasheet, Virage, Inc., San Mateo, California, 2003, 2 pgs.
"VideoLogger®: Automate Video Encoding and Indexing," Datasheet, Virage, Inc., San Mateo, California, 2003, 3 pgs.
1998 Everest Expedition: Technology, http://www.everest.org/Everest/tech.html, Datacam Technology, Jul. 31, 1998, 2 pgs.
Arons, B., "Techniques, Perception, and Applications of Time-Compressed Speech," Proceedings of 1992 Conference, American Voice I/O Society, Sep. 1992, 19 pgs.
Brooks et al., "Computer Graphics Animations of Talking Faces Based on Stochastic Models," ISSIPNN '94, 1994 International Symposium on Speech, Image Processing and Neural Networks, Proceedings, vol. 1, Apr. 1994, pp. 73-76.
Buckley et al., "The Effect of Adding Relevance Information in a Relevance Feedback Environment," Proceedings of the 17th Annual Conference on Research and Development in Information Retrieval, Jul. 3-6, 1994, pp. 292-300.
Carter, S. et al., "Improving Video-on Demand Server Efficiency Through Stream Tapping," 1997 IEEE, pp. 200-207.
Carter, S. et al., "Video-on-Demand Broadcasting Protocols," pp. 1-25.
Chen, F. et al., "The Use of Emphasis to Automatically Summarize a Spoken Discourse," 1992 IEEE International Conference on Acoustics, Speech and Signal Processing, Mar. 23-26, 1992, pp. I-229 and I-232.
Chen, T. et al, "Lip synchronization in talking head video utilizing speech information," SPIE, Visual Communications and Image Processing '95, vol. 2501, Jul. 1995, pp. 1690-1701.
CNN At Work White Paper, 1994, 22 pages.
Covell et al, "Spanning the Gap Between Motion Estimation and Morphing," Proceedings of the IEEE International Conference on Acoustics, Speech and Signal Processing Apr. 19-22, 1994, Adelaide, Australia, http://www.mangolassi.org/covell/1994-010/ [Internet Accessed on Apr. 29, 2008].
Elliott, E., "Multiple Views of Digital Video," MIT Media Laboratory, Interactive Cinema Group, Mar. 23, 1992, 4 pages.
Elliott, E., "Watch, Grab, Arrange, See: Thinking with Motion Images via Streams and Collages", Masters thesis, School of Architecture and Planning, Massachusetts Institute of Technology, Feb. 1993, pp. 3, 5, 7, 10-11, 13-35, 37-49, 5-61, 63-85,87-99, 101, 103-105.
Flanagan, J.L. et al., "Computer-steered microphone arrays for sound transduction in large rooms," J. Acoust. Soc. Am. 78 (5), Nov. 1985, pp. 1508-1518.
Forsyth, David et al., "Searching for Digital Pictures," Scientific American, Jun. 1997.
Froba, Bernhard et al., "Multi-Sensor Biometric Person Recognition in an Access Control System," Proceedings Second International Conference on Audio- and Video-Based Biometric Person Authentication, Mar. 22-23, 1999, Washington, D.C., pp. 55-59.
Frost III, Otis, "An Algorithm for Linearly Constrained Adaptive Array Processing," Proceedings of the IEEE, vol. 60, No. 8, Aug. 1972, pp. 926-935.
Gemperle, Francine et al., "Design for Wearability," IEEE, 1998, pp. 116-122.
Grenier, Yves, "A microphone array for car environments," Speech Communication, vol. 12, No. 1, Mar. 1993, pp. 25-39.
Haeberli, Paul et al., "Automatic Panoramic Image Merging," World Wide Web, Grafica Obscura, 1998, 2 pages.
Hall, Allan, "A new spin on power dressing," Associated Newspapers Ltd., Sep. 14, 1999..
Hauptman et al., "Speech for Multimedia Information Retrieval," UIST '95(ACM), Nov. 14, 1995, pp. 79-80.

Hauptmann et al., "Text, Speech, and Vision for Video Segmentation: The Informedia™ Project," AAAI Fall Symposium, Computational Models for Integrating Language and Vision, Nov. 10-12, 1995, 12 pages.
Healey, Jennifer et al., "Quantifying Driver Stress: Developing a System for Collecting and Processing Bio-Metric Signals in Natural Situations," Proceedings of the Rocky Mountain Bio-Engineering Symposium, Apr. 16-18, 1999.
Healey, Jennifer et al., "StartleCam: A Cybernetic Wearable Camera," Second International Symposium on Wearable Computers, Oct. 19-20, 1998, pp. 42-49.
Henton, Caroline, et al, "Saying and Seeing It With Feeling: Techniques for Synthesizing Visible, Emotional Speech".
Horner, "NewsTime: A Graphical User Interface to Audio News," Masters thesis, School of Architecture and Planning, Massachusetts Institute of Technology, Jun. 1993, pp. 1-84.
Huttenlocher et al., "Tracking Non-Rigid Objects in Complex Scenes," IEEE International Conference on Computer Vision, 1993, pp. 93-101.
Kelly, Patrick H. et al., "An Architecture for Multiple Perspective Interactive Video," Multimedia 1995, pp. 201-212.
La Lunette Camera—Alain Mikli, http://www.mikli.fr/eng/Actualites/Lcamera/Lcamera.htm?Nav=1, La Lunette Camera Sunglasses, Jul. 27, 1998, 1 page.
Lindblad et al., "ViewStation Applications: Implications for Network Traffic," IEEE Journal on Selected Areas in Communications, vol. 13, No. 5, Jun. 1995, pp. 768-777, New York, NY, US.
Mann, S. et al., "Video Orbits of the Projective Group: A simple approach to featureless estimation of parameters," IEEE Trns. Image Proc., Jul. 1997..
Mann, S. et al., "Virtual Bellows: Constructing High Quality Stills from Video," IEEE, 1994, pp. 363-367.
Moulines et al., "Non-parametric techniques for pitch-scale and time-scale modification of speech," Speech Communication, vol. 16, 1995, pp. 175-205.
Paris et al., "A Low Bandwidth Broadcasting Protocol for Video on Demand," IC3N '98, Oct. 1998, pp. 640-647.
Paris, Jehan-Francois et al, "A Low Bandwidth Broadcasting Protocol for Video on Demand", IC3N '98, pp. 640-647, Oct. 1998. cited by other.
Phillips, P. Jonathan et al., "The FERET Evaluation," Face Recognition: From Theory to Applications, 1998, pp. 244-261.
Product description for SMPTE Time Code Products for GPS Video Position Logging, Horita Co., Inc., Viejo, California, 1998.
Product description for Studio Master Time Code and Sync Generators, Horita Co., Inc., Viejo, California, 1998.
Rabiner, A Tutorial on Hidden Markov Models and Selected Applications in Speech Recognition, Proceedings of the IEEE, vol. 77, No. 2, Feb. 1989. pp. 257-285.
Reynolds, "A Gaussian Mixture Modeling Approach to Text-Independent Speaker Identification," Ph.D. thesis, Dept. of Electrical Engineering, Georgia Institute of Technology, 1992, pp. 1-154.
Rosenberg, Aaron et al., "Recent Research in Automatic Speaker Recognition," Advances in Speech Signal Processing, 1992, pp. 701-738.
Roucos et al., "High Quality Time-Scale Modification for Speech," Proceedings of the International Conference on Acoustic, Speech, and Signal Processing, IEEE, 1985, pp. 493-496.
Sakauchi et al., "Multimedia Database Systems for the Contents Mediator," IEICE Trans. Inf. and Syst., vol. E79-D, No. 6, Jun. 1996, pp. 641-646.
Salton et al., "Improving Retrieval Performance by Relevance Feedback," Journal of the American Society for Information Science, vol. 41, No. 4, Jun. 1990, pp. 288-297.
Scheirer et al., "Construction and Evaluation of a Robust Multifeature Speech/Music Discriminator," Proc. ICASSP, Apr. 21-24, 1997, pp. 1-4.
Scott et al, "Synthesis of Speaker Facial Movement to Match Selected Speech Sequences," Speech Science and Technology '94, Dec. 5-8, Perth, Australia, 6pgs.

(56) References Cited

OTHER PUBLICATIONS

Senior, Andrew, "Face and feature finding for a face recognition system," Proceedings Second International Conference on Audio- and Video-based Biometric Person Authentication, Mar. 22-23, 1999, Washington, D.C., pp. 154-159.

Shahraray et al., "Automatic generation of pictoral transcripts of video programs," SPIE, vol. 2417, Jan. 1995, pp. 512-518.

Shibata M., "A Description Model of Video Content and Its Application for Video Structuring," Systems and Computers in Japan, vol. 27, No. 7, Jun. 1996, pp. 70-83.

Slaney, Malcolm et al., "Baby Ears: A Recognition System for Affective Vocalizations," Proceeding of the 1998 International Conference on Acoustics, Speech, and Signal Processing (ICASSP), Seattle, WA, May 12-15, 1998.

Sony ClipLink Guide, pp. 9-14, 1996.

Sony PowerHAD digital camcorder operating instructions, pp. 65-71, 1998.

Supercircuits Microvideo Catalog, GC1 Professional Grade Color Covert Glasses Cam, 1998, 1 page.

Szeliski, Richard et al., "Creating Full View Panoramic Image Mosaics and Environment Maps," Computer Graphics Proceedings, Annual Conference Series, 1997, pp. 251-258.

Szeliski, Richard, "Video Mosaics for Virtual Environments," IEEE Computer Graphics and Application, Mar. 1996, pp. 22-30.

Tennenhouse et al., "The ViewStation: a software-intensive approach to media processing and distribution," Proceedings of the 17th Annual Conference on Research and Development in Information Retrieval, Jul. 3-6, 1994, pp. 104-115.

Velbon.com, "CX Series Photo Tripods," and "DF-Series 'Dual Function' Photo/Video Tripods," 3 pgs. [internet accessed on Apr. 13, 1999].

Virtual Tech, "Thousands of New Products are introduced every year by hundreds of companies . . . ," Toyoda Machinery USA, believed to be in use in Japan in 1998, 2 pages.

Viswanhthan et al., "Metropolitan Area Video-On-Demand Service Using Pyramid Broadcasting", Multimedia Systems, vol. 4, pp. 197-208, 1996.

Viswanhthan et al., "Pyramid Broadcasting for Video on Demand Service", SPIE Proceedings, vol. 2417, pp. 66-78, Feb. 1995.

Wactlar et al., "Intelligent Access to Digital Video: Informedia Project," Computer, vol. 29, No. 5, May 1996, pp. 46-52.

Welsh et al., "Facial Image Coding Using Principal Components," Electronics Letters, vol. 28, No. 22, Oct. 1992, pp. 2066-2067.

Yeung M. M. et al., "Efficient Matching and Clustering of Video Shots," IEEE '95 (ICIP), vol. 1, Oct. 1995, pp. 338-341.

Zabih et al., "A Real-Time System for Automatically Annotating Unstructured Image Sequences," IEEE International Conference on Systems, Man, and Cybernetics, 1993, 6 pages.

Zhang et al., "Automatic Parsing of News Video," IEEE Conference on Multimedia Computing and Systems, 1994, pp. 45-54.

SYSTEM AND METHOD FOR THE BROADCAST DISSEMINATION OF TIME-ORDERED DATA

CROSS-REFERENCE TO RELATED APPLICATION(S)

This application is divisional of U.S. patent application Ser. No. 13/235,740, entitled SYSTEM AND METHOD FOR THE BROADCAST DISSEMINATION OF TIME-ORDERED DATA, filed Sep. 19, 2011, which is a divisional of U.S. patent application Ser. No. 12/388,557, entitled SYSTEM AND METHOD FOR THE BROADCAST DISSEMINATION OF TIME-ORDERED DATA, filed Feb. 19, 2009 (now U.S. Pat. No. 8,046,818), which is a continuation of U.S. patent application Ser. No. 11/106,173, entitled SYSTEM AND METHOD FOR THE BROADCAST DISSEMINATION OF TIME-ORDERED DATA, filed Apr. 13, 2005 (now U.S. Pat. No. 7,565,681), which is a continuation of U.S. patent application Ser. No. 09/414,514, entitled SYSTEM AND METHOD FOR THE BROADCAST DISSEMINATION OF TIME-ORDERED DATA, filed Oct. 8, 1999 (now U.S. Pat. No. 7,155,735), each of which is incorporated herein by reference in its entirety for all purposes.

TECHNICAL FIELD

The present invention is directed to systems for broadcasting time-ordered data, such as streaming media presentations, and more particularly to a system which minimizes the delay between a user's indication of a desire to receive the data and the commencement of the utilization of the data, with efficient use of the broadcast bandwidth.

BACKGROUND

A variety of situations exist in which users desire access to time-ordered data, and prefer to begin utilizing that data as soon as possible after they have entered a request for the data. One example is the reproduction of streaming media data, such as a video presentation or a musical rendition. In the case of a video, for instance, a television system subscriber may desire to view a particular movie that is being broadcast by a cable or satellite television network.

In a conventional television system, the subscriber is required to wait until the scheduled time at which the movie is to be broadcast before it is possible to begin viewing it. For instance, a given movie may be repetitively broadcast on a particular channel every two hours. If the subscriber becomes aware of the movie's availability one half hour after the most recent broadcast has begun, it is necessary to wait an hour and a half before the movie can be viewed in its entirety from start to finish. As an alternative, the subscriber could choose to ignore the first half hour that was missed, and view the remaining portion of the movie. In many situations, however, this alternative is unacceptable, particularly where the initial portion of the movie is essential to an understanding of events that occur later in the movie.

To alleviate this situation, different approaches have been employed to reduce the time that a subscriber must wait until the next instance at which the beginning of the movie becomes available. In general, the maximum potential waiting period is reduced by allocating a greater amount of bandwidth, e.g., number of channels, to the movie. In certain situations, the available bandwidth is sufficient to provide true video-on-demand to all viewers, whereby the movie begins to be transmitted in its entirety to any viewer immediately upon receiving a request for the movie. In practice, however, this capability can only be cost-effective in a relatively small, closed environment, such as within a hotel or an apartment building. In these situations, where the number of viewers at any given time is limited, it is possible to effectively dedicate a channel to each viewer and to begin a transmission of the movie over a viewer's channel upon receipt of a request to begin the movie.

This approach to video-on-demand services is not economically feasible in a broadcast environment, where the number of potential viewers is so large that the required bandwidth becomes cost-prohibitive. Consequently, broadcasters employ an approach that is labeled "near-video-on-demand". In this approach, a popular movie is broadcast at multiple staggered start times over a limited number of channels. For instance, a two-hour movie can be broadcast over four channels at 30 minute intervals. Consequently, the viewer never has to wait more than 30 minutes for the start of the next presentation. With this approach, the number of channels occupied by a given movie is inversely proportional to the wait period. If 5 minutes is considered to be an acceptable wait time, a two-hour movie would require 24 channels. A one-minute wait time would occupy 120 channels.

In an effort to simulate true video-on-demand capabilities in a near-video-on-demand environment, a class of techniques has been developed which rely upon preliminary storage of part of the movie at the viewer's premises. One example of this technique is described in U.S. Pat. No. 5,884,141. In this technique, a desired movie is transmitted over multiple channels at staggered times, as in near-video-on demand. If the staggered presentation is to begin every 30 minutes, for example, the first 30 minutes of the movie, known as the leader, is automatically stored at the subscriber's premises. When a subscriber enters a request to view the movie, for example by pressing a "play" button on a set-top converter or a remote control unit, or by dialing a specified phone number, the first 30 minutes of the movie is replayed from the locally stored leader. During this time, the remaining portion of the movie, which occurs after the leader, begins to be stored from one of the channels allocated to the movie, and is replayed in a time-shifted fashion after the replay of the stored leader has completed.

Using this approach, the number of movies that can be viewed with substantially no wait time is determined by the amount of local storage capacity at the subscriber's premises. For example, several gigabytes of storage in the set-top converter unit are required to cache a 30-minute leader for each of ten select movies. If the subscriber desires to view any movie other than the ten whose leaders have been stored, the normal near-video-on-demand wait time would be encountered, e.g., 30 minutes.

While this approach can significantly reduce viewer wait times, relative to conventional and near-video-on-demand transmissions, it is highly dependent upon the amount of storage capacity that is available at the user's premises. It is desirable to provide video-on-demand capabilities in a broadcast environment with significantly reduced storage requirements at the subscriber's premises, and without a subscriber-hardware-based limit on the number of broadcast presentations that can be viewed with minimal wait times.

A broadcast technique which offers such a possibility is described in U.S. Pat. Nos. 5,751,336 and 5,936,659, as well as related publications "Pyramid Broadcasting for Video On Demand Service," by S. Viswanathan and T. lmielinski, *SPIE Proceedings*, Vol. 2417, pp. 66-78, February 1995, and "Metropolitan Area Video-On-Demand Service Using Pyramid Broadcasting" by Viswanathan and lmielinski, *Multimedia*

*Systems*, Vol. 4, pp. 197-208, 1996. In the technique described in these documents, each movie is divided into segments of increasing size, and each segment is repeatedly transmitted in an associated logical channel of the broadcast medium. In the disclosed implementations, each segment is approximately 2-2.5 times longer than the preceding segment. At the receiving end, once the first segment is received, all of the other segments are received in time, so that continuous viewing of the movie is possible.

While this technique provides improved results relative to the approaches described previously, the particular embodiments disclosed in the patents and related publications still require a significant amount of bandwidth. It is an objective of the present invention to improve upon the basic principles described in these references, and provide more efficient bandwidth utilization while minimizing viewer access time. It is a further objective to address some of the practical problems associated with the implementation of this technique which are not addressed in the references.

SUMMARY

In accordance with the present invention, the foregoing objectives are achieved by dividing a stream of time-ordered data into multiple fragments of equal length, and repetitively transmitting the fragments at different respective repetition rates. The fragments are reordered for transmission so that those which occur near the beginning of the original data stream are transmitted more frequently than those which occur later in the data stream. When a subscriber enters a request to utilize the data, e.g., view a movie, the individual fragments are stored upon receipt at the subscriber's premises, and reassembled into a contiguous stream for the subscriber. The ordering of the fragments is such that the wait time required before utilization of the data can begin is limited to a predetermined maximum, and at least one copy of every fragment becomes available by the time it is needed.

Various techniques are provided by the present invention that offer practical advantages for the broadcaster and the subscriber within this general mode of operation. In one approach, a conventionally transmitted data stream, in which each of the fragments appear in their sequential order, accompanies the reordered transmission. This sequentially ordered stream of data can be viewed in a conventional manner by subscribers who do not have the local storage required to decode the reordered transmission. Some of the fragments that appear within the conventionally transmitted data stream are employed as substitutes, or proxies, for some of the reordered fragments. As a result, fragments can be deleted from the reordered transmission, to make the overall transmission periodic and thereby allow a given program to be broadcast indefinitely by repeatedly transmitting a finite data stream. In a further implementation, this approach can be used to reduce the time that users must wait between the end of the availability of one movie and the time at which the viewing of a new movie can begin.

Further features of the invention relate to encoding techniques that provide for effective use of the available bandwidth, and an approach to multiplexing which accommodates variable data rates within a fixed bandwidth transmission. These and other features of the invention, as well as the advantages provided thereby, are explained in greater detail hereinafter with reference to exemplary embodiments of the invention depicted in the accompanying drawings.

DETAILED DESCRIPTION

Figure 1:
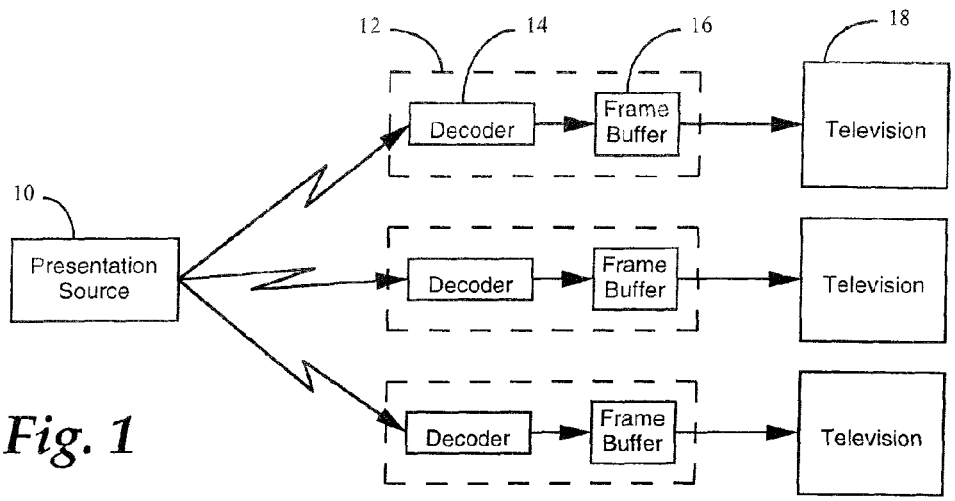
FIG. 1 is a general block diagram of a broadcast system of the type in which the present invention can be implemented.

Generally speaking, the present invention comprises a set of techniques for the efficient operation of a system which provides virtual on-demand access to temporally-ordered data that is disseminated via a broadcast medium. To facilitate an understanding of the principles which underlie the invention, it is described hereinafter with reference to a specific application thereof. In particular, reference is made to the use of the invention in the context of streaming media presentations, such as televised movies. It will be appreciated, however, that the practical applications of the invention are not limited to these particular examples. Rather, the invention can be employed in any situation in which it is desirable to provide temporally-ordered data in a manner which permits a user to enter a request to receive the data at any arbitrary point in time, and to begin utilization of the data with minimal delay after such a request.

In the context of the present invention, the term "temporally-ordered data" refers to any collection of data in which some portion of the data must be received prior to the time that another portion of the data can be utilized. For instance, in the case of a video presentation, the frames of a movie can be received in any order, and stored for subsequent presentation. However, the viewer cannot begin to watch the movie until the first frame has been received. The invention guarantees that the first frame is available with a minimal time delay, and each succeeding frame is also available by the time it is needed to recreate the original sequence. In another application, the invention can be employed to broadcast software programs, and similar types of data, in which some portions of the program are required for the user to begin its operation, whereas other portions may not be required until later in the operation, and can therefore be received after the operation has been initiated. In yet another application, the invention can be employed to broadcast media objects such as audio, video or animation in the context of a multimedia presentation.

The basic objective of the present invention is to reduce the wait time that is experienced by users between the entry of a request to receive data, such as a movie, and the time when the utilization of the data in its time-ordered fashion can begin, while minimizing the amount of bandwidth and local data storage that is needed to support such a capability. The techniques of the invention are implemented in a system in which the temporally-ordered data is divided into a sequence of small equally-sized fragments, and the fragments are repetitively transmitted in one or more streams over a suitable broadcast medium, such that the fragments at the beginning of the presentation are transmitted at a relatively high density, whereas those near the end of the presentation are transmitted with a lower density. To facilitate an understanding of the principles which underlie the invention, the basic concept of such a system is first described with reference to relatively simple examples, followed by more detailed discussions of various optimizations that are provided by the invention. In the following discussion, a stream of data which is transmitted in accordance with the foregoing principle, where fragments are re-ordered with differing densities, is identified as an "encoded" stream, whereas a stream of data in which the fragments are transmitted in their original sequential order is identified as a "conventional" stream.

General Concept

Referring to FIG. 1, an encoded stream of data fragments which constitute a video presentation is transmitted from a source 10, such as a cable head-end transmission station, to multiple subscribers' premises. At each subscriber's premises, the stream of fragments is received in a suitable set-top converter 12, or other equivalent type of equipment for receiving signals from the source. A decoder 14 within the converter reassembles the fragments into a continuous video stream, and stores them in a suitable frame buffer 16, where they are sequentially presented to the subscriber's television receiver 18. The ordering of the fragments in the encoded stream is such that, regardless of any arbitrary point in time at which any subscriber enters a request to view the presentation, the first fragment of the presentation is available within a maximum period of time $\tau$, and at least one copy of any given fragment becomes available by the time it is needed for viewing in the proper order.

Figure 2:
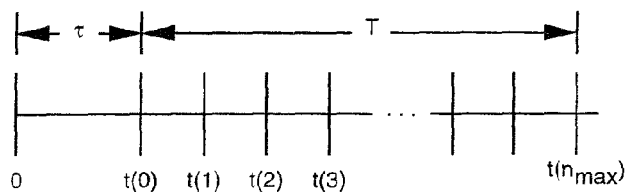
FIG. 2 is a time line depicting a sequence of fragments in a presentation.

FIG. 2 is a time line which illustrates the relationship of various factors that are employed throughout the following discussion. Time 0 is considered to be the moment at which the subscriber presses a "play" button or performs an analogous action to enter a request to view a presentation or otherwise utilize temporally-ordered data. Time instant t(0) is the moment at which the display of the first fragment in the media presentation begins, $\tau$ seconds later. Each fragment n of the presentation is displayed at a corresponding time t(n). The following variables are also employed in the discussion of the principles which underlie the invention:

G Size of a fragment
$n_{max}$ Index of the last fragment in the presentation
T Total running time of the presentation
v(n) Fragment density, i.e., the number of times the n-th fragment appears in a data stream of length T
$\eta$ A bandwidth multiplier
m(n) Nominal bandwidth of the presentation at fragment n.

The bandwidth multiplier, or expansion coefficient, $\eta$ describes the amount of bandwidth that is needed to provide a wait time $\tau$, compared to the amount of bandwidth B that would be required for a conventional data stream. For instance, a movie might be transmitted at a nominal bit rate of 3 Mb/s. Thus, a bandwidth multiplier of 9 indicates a bit rate of 27 Mb/s. The bandwidth multiplier can be expressed as a function of T and $\tau$. To simplify the initial discussion of the principles which underlie the invention, it is assumed that the repetitively transmitted copies of a given fragment are uniformly distributed in time. Furthermore, it will be assumed that G is a constant, i.e. all of the fragments are of equal size. In the case of a media presentation, the size of a fragment can be thought of in terms of a time increment of the presentation, e.g. 0.5 second. When considering transmission and storage issues, however, the size of a fragment is preferably expressed as an amount of data. In one embodiment, each fragment contains 188 bytes of data.

Each fragment n is transmitted repeatedly, ideally at time intervals of length (T/v(n)). Consequently, the first occurrence of a fragment n is no later than (T/v(n)). To guarantee contiguous assembly of the fragments at the viewer's premises, the fragment must be received no later than t(n). Therefore, the fragment density must conform to the following relationship:

$$(T/v(n)) \leq t(n) \qquad (1)$$

or $$v(n) \geq T/t(n) \qquad (2)$$

Thus, the fragment density, or repetition rate, is a decreasing function of n, the fragment's location within the original presentation.

A lower bound on the bandwidth multiplier is given by the mean fragment density:

$$\eta \geq \frac{1}{T} \int_0^T \left(\frac{T}{t+\tau}\right) dt \qquad (3)$$

$$= \ln\left(1 + \frac{T}{\tau}\right) \qquad (4)$$

$$\approx \ln\left(\frac{T}{\tau}\right) \qquad (5)$$

Encoding

The fragment stream is encoded so that the individual fragments repeat with a density that satisfies the relationship defined at (2) above. A variety of different encodings are possible which comply with this relationship. In one embodiment, the presentation is divided into a plurality of segments, and each segment is repetitively transmitted as a substream of fragments. Each of the individual substreams can be transmitted in parallel with all of the other substreams. More preferably, however, all of the substreams are transmitted in a time-division multiplexed manner, to form a complete data stream of encoded data.

The first substream contains a repeating loop of the lowest-numbered fragments in a presentation, e.g., the earliest frames in a movie. The maximum length of that segment is defined as the maximum length of time by which successive copies of the same fragment can be separated and still meet the constraints of relationship (2). As many fragments as possible are contained in the segment, until that limit is reached. The next succeeding substream contains a repeating loop of the lowest-numbered fragments that are not in the preceding substream. This segment can be at least as long as the preceding segment, and typically will be longer because the maximum spacing between its lowest-numbered fragment will be greater. Successive segments are determined in this manner, until the entire presentation is encoded. The number of substreams, which corresponds to the number of segments, determines the bandwidth multiplier $\eta$.

This encoding scheme will first be explained with reference to an example that is orderly, and which corresponds to the embodiments disclosed in the previously cited references. The first fragment in a segment i is labeled with the index $n_i$, where $n(0)=0$. There are a total of N segments in the presentation. In this first example, each substream i is allocated the same amount of bandwidth as that which would normally be allocated to the presentation when it is transmitted in a conventional, i.e., time-ordered sequential, manner. Typically, this bandwidth is about 3 Mb/s for a video presentation that is compressed according to the MPEG encoding standard.

Figure 3:
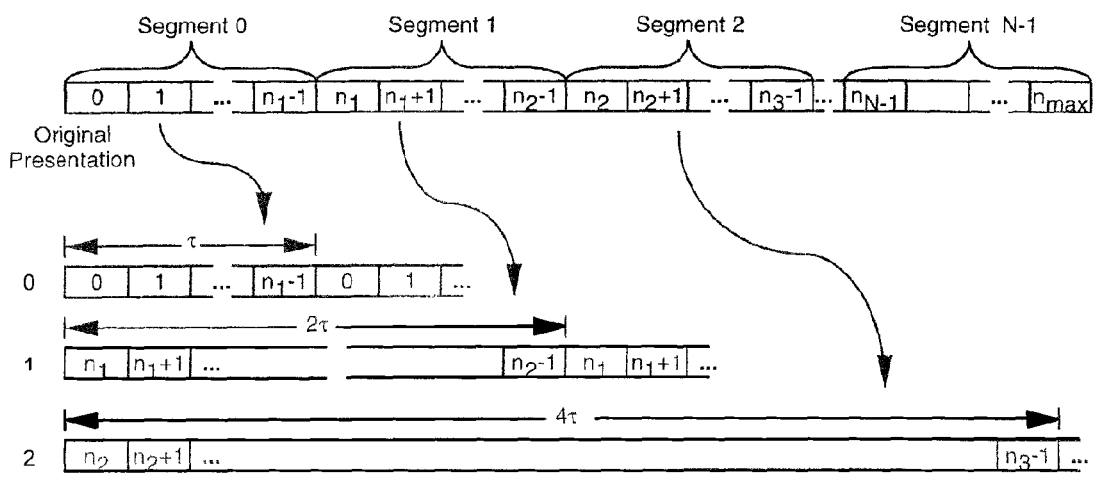
FIG. 3 illustrates one example of the manner in which a presentation can be divided into segments for allocation to transmission substreams.

FIG. 3 illustrates the manner in which the segments are derived from the original presentation in this initial example, for allocation to respective substreams. The presentation is divided into a sequence of $n_{max}$ fragments. Since the maximum wait time is defined as $\tau$, the beginning of the presentation must be available at least every $\tau$ seconds. Therefore, the initial segment contains the first $\tau$ seconds of the presentation, in this case fragments $n_0$ through $n_1-1$. The first substream, i.e., Substream 0, consists of a repeating copy of this segment.

The beginning of the remainder of the movie must be available at least every $2\tau$ seconds, i.e., the initial wait period $\tau$ plus the length of the preceding segment, which is equal to $\tau$. Accordingly, the second segment contains the next $2\tau$ seconds of the movie, in this case fragments $n_1$ through $n_2-1$. The second substream comprises a repeating copy of this second segment.

The beginning of the next segment, which is $3\tau$ seconds into the presentation, must be available every $4\tau$ seconds, i.e., the length of the wait time $\tau$, the first segment $\tau$ and the second segment $2\tau$. Therefore, the next segment contains the next $4\tau$ seconds of the presentation, which is repeatedly transmitted in the third substream. Continuing on in this manner, each successive segment is twice as long as the previous segment, and is therefore transmitted in its respective substream at one-half the repetition rate of the previous segment.

After N segments have been obtained, the total length of the presentation is $(2^N-1)\tau$. For instance, by using seven substreams is possible to transmit a movie of length $127\tau$. Referring to Equation 5, the optimum bandwidth multiplier $\eta$ for a movie of length $127\tau$ is $ln(127)$, or 4.84. Hence, an encoding scheme of the type described above, which requires seven substreams, and hence where $\eta=7$, uses more bandwidth than that which is optimal.

Figure 4:
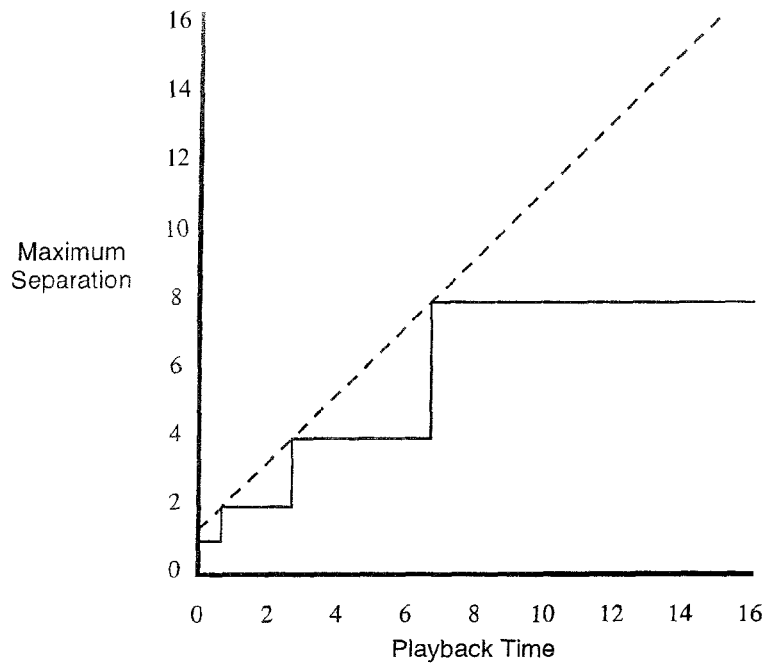
FIG. 4 is a plot of the separation of fragment copies versus playback time for the embodiment of FIG. 3.

FIG. 4 illustrates a plot of the maximum separation between copies of a fragment versus the time at which that fragment is expected to be presented. The solid line illustrates the encoding example described above, and the dashed line depicts the theoretical optimum defined by Equation 5. This plot reveals that excess bandwidth is consumed by portions of the presentation that are repeated more often than necessary. For instance, a fragment of the presentation which occurs just prior to $3\tau$ seconds into the presentation can, in theory, be available about every $4\tau$ seconds. However, in the foregoing encoding scheme, it is repeated nearly every $2\tau$ seconds. Excessive bandwidth requirements occur when a segment is too long, since the start and end of the segment can have vastly different requirements with regard to the maximum separation of successive copies of a fragment that is needed to satisfy relationship (2).

In the orderly embodiment described above, that separation varies by a factor of two within a given segment. More optimum encoding schemes can reduce that variation, through the use of shorter segments, which in turn reduces the bandwidth that is allocated to each substream. For instance, each substream could be allocated one-tenth of the bandwidth that is allocated to a conventional video signal stream, e.g., 0.3 Mb/s. In this case, therefore, the first substream requires only enough bandwidth to repetitively transmit the first $0.1\tau$ seconds of the presentation. The beginning of the remainder of the presentation must be available every $1.1\tau$ seconds, i.e., the length of the wait time $\tau$ plus the length of the first segment. Therefore, the second segment comprises the next $0.11\tau$ seconds of the presentation. The beginning of the third segment must be available every $1.21\tau$ seconds, so this segment comprises the next $0.121\tau$ seconds of the movie.

In this approach, each successive segment is 10% longer than its predecessor. After N segments have been obtained, the total length of the presentation, T, can be defined as:

$$T = 0.1\tau \sum_{i=0}^{N-1} (1.1)^i \tag{6}$$

$$= 0.1\tau \left( \frac{(1.1)^N - 1}{0.1} \right) \tag{7}$$

$$= ((1.1)^N - 1)\tau \tag{8}$$

By means of this approach, a presentation of length $128\tau$ can be transmitted in 51 substreams. Since each substream is 1/10 the bandwidth of a conventional video stream, the bandwidth multiplier $\eta$ equals 5.1. It can be seen that this encoding scheme is substantially closer to the optimal bandwidth of Equation 5 than the orderly example described previously, where $\eta=7$.

The foregoing approach can be generalized by allocating each substream an amount of bandwidth $\lambda B$, where B is the bandwidth of a conventional video stream, e.g., 3 Mb/s, and $\lambda$ is a positive number in the range from 0 to 1. In a preferred embodiment of the invention, $\lambda$ is the same for every substream, i.e. each substream receives equal bandwidth. In this case, the total length of the presentation is defined by the following power series:

$$T = \lambda\tau \sum_{i=0}^{N-1} (1+\lambda)^i \tag{9}$$

$$= \lambda\tau \left( \frac{(1+\lambda)^N - 1}{\lambda} \right) \tag{10}$$

$$= ((1+\lambda)^N - 1)\tau \quad (11)$$

and the bandwidth multiplier $\eta$ is:

$$\eta = \lambda N \quad (12)$$

$$= \frac{\lambda}{\ln(1+\lambda)} \ln\left(\frac{T}{\tau}+1\right) \quad (13)$$

The factor $\ln(T/\tau+1)$ is equal to the optimal bandwidth multiplier set forth in Equation 4. The excessive bandwidth is therefore represented by the factor $\lambda/\ln(1+\lambda)$, where a value of unity corresponds to optimal. Hence the excess bandwidth requirements shrink as $\lambda$ is reduced toward zero, i.e. decreasing $\lambda$ reduces the required bandwidth. Preferably, $\lambda$ is less than or equal to ½, and in practical embodiments of the invention ⅓≤λ≤½s.

The foregoing analysis assumes that each segment i has an optimal length corresponding to a repetition period of:

$$p(i) = \tau(1+\lambda)^i.$$

In practice, however, it may not be possible to achieve such an optimum value for each segment. In particular, if the substreams are to be transmitted using a simple form of time-division multiplexing, each segment must contain an integral number of equal-length fragments. This requirement imposes a quantization constraint on the lengths of the segments. In effect, this means that a quantity $\delta$ must be subtracted from the optimal length of the segment. The value of $\delta$ can be up to the length of one fragment.

The foregoing analysis will now be reviewed, taking this quantization constraint into account. Since the first substream is allocated enough bandwidth to repetitively transmit the first $\lambda\tau$ seconds of the presentation, the first segment has a length of $\lambda\tau-\delta$ seconds. The beginning of the remainder of the presentation must be available every $\tau+(\lambda\tau-\delta)$ seconds, which turns out to be $(1+\lambda)\tau-\delta$ seconds. Therefore, the second substream can repetitively transmit the next $\lambda(1+\lambda)\tau-\lambda\delta$ seconds of the movie. Upon quantization, therefore, the second segment has a length of $\lambda(1+\lambda)\tau-(1+\lambda)\delta$ seconds. Continuing on in this fashion, it will be seen that the i-th substream repetitively transmits $(\lambda\tau-\delta)(1+\lambda)^i$ seconds of the presentation.

When the quantization factor is considered, the total length of the presentation becomes $$T = (\lambda\tau - \delta) \sum_{i=0}^{N-1} (1+\lambda)^i \quad (14)$$

$$= \tau'[(1+\lambda)^N - 1] \quad (15)$$

$$= (\lambda\tau - \delta)\left[\frac{(1+\lambda)^N - 1}{\lambda}\right] \quad (16)$$

where $$\tau' = \tau - \frac{\delta}{\lambda} \quad (17)$$

The following Table 1 illustrates a sample encoding for a 2-hour presentation, such as a movie, in accordance with the foregoing concepts. In this example, each fragment consists of 0.5 second, e.g. 1.5 Mb, and the parameter $\lambda$ equals ⅓, so that each substream is allocated approximately 1 Mb/s. The value of $\tau$ is 27 fragments, or 13.5 seconds, and the quantization factor $\delta$ is 1.5 seconds, to provide a maximum wait time of 15 seconds. Since there are 22 substreams, the aggregate bandwidth requirement is 22 Mb/s, so that the bandwidth multiplier $\eta$=7.33.

Each row of Table 1 corresponds to one substream. Hence, Substream 0 consists of a repeating sequence of fragments 0 through 8, Substream 1 consists of a repeating sequence of fragments 9 through 20, etc. Each column of Table 1 represents one time slot for the time-division multiplexed transmission of all of the substreams. Thus, in the first time slot, fragments 0, 9, 21, 37, 58 . . . are transmitted, and in the next time slot fragments 1, 10, 22, 38, 59 . . . are transmitted. In practice, the rows of the table continue indefinitely to the right, until such time as the transmission of the presentation is terminated. The encoded presentation is stored at the source 10, and repeatedly transmitted over the substreams, as shown in Table 1.

| Substream | Fragment Sequence | | | | | | | | | |
|---|---|---|---|---|---|---|---|---|---|---|
| 0 | 0 | 1 | 2 | 3 | 4 | 5 | 6 | 7 | 8 | 0 | 1 |
| 1 | 9 | 10 | 11 | 12 | 13 | 14 | 15 | 16 | 17 | 18 | 19 |
| 2 | 21 | 22 | 23 | 24 | 25 | 26 | 27 | 28 | 29 | 30 | 31 |
| 3 | 37 | 38 | 39 | 40 | 41 | 42 | 43 | 44 | 45 | 46 | 47 |
| 4 | 58 | 59 | 60 | 61 | 62 | 63 | 64 | 65 | 66 | 67 | 68 |
| 5 | 86 | 87 | 88 | 89 | 90 | 91 | 92 | 93 | 94 | 95 | 96 |
| 6 | 123 | 124 | 125 | 126 | 127 | 128 | 129 | 130 | 131 | 132 | 133 |
| 7 | 173 | 174 | 175 | 176 | 177 | 178 | 179 | 180 | 181 | 182 | 183 |
| 8 | 239 | 240 | 241 | 242 | 243 | 244 | 245 | 246 | 247 | 248 | 249 |
| 9 | 327 | 328 | 329 | 330 | 331 | 332 | 333 | 334 | 335 | 336 | 337 |
| 10 | 445 | 446 | 447 | 448 | 449 | 450 | 451 | 452 | 453 | 454 | 455 |
| 11 | 602 | 603 | 604 | 605 | 606 | 607 | 608 | 609 | 610 | 611 | 612 |
| 12 | 811 | 812 | 813 | 814 | 815 | 816 | 817 | 818 | 819 | 820 | 821 |
| 13 | 1090 | 1091 | 1092 | 1092 | 1094 | 1095 | 1096 | 1097 | 1098 | 1099 | 1100 |
| 14 | 1462 | 1463 | 1464 | 1465 | 1466 | 1467 | 1468 | 1469 | 1470 | 1471 | 1472 |
| 15 | 1958 | 1959 | 1960 | 1961 | 1962 | 1963 | 1964 | 1965 | 1966 | 1967 | 1968 |
| 16 | 2619 | 2620 | 2621 | 2622 | 2623 | 2624 | 2625 | 2626 | 2627 | 2628 | 2629 |
| 17 | 3501 | 3502 | 3503 | 3504 | 3505 | 3506 | 3507 | 3508 | 3509 | 3510 | 3511 |
| 18 | 4677 | 4678 | 4679 | 4680 | 4681 | 4682 | 4683 | 4684 | 4685 | 4686 | 4687 |
| 19 | 6245 | 6246 | 6247 | 6248 | 6249 | 6250 | 6251 | 6252 | 6253 | 6254 | 6255 |

-continued

| | | | | | | | | | | | |
|---|---|---|---|---|---|---|---|---|---|---|---|
| 20 | 8335 | 8336 | 8337 | 8338 | 8339 | 8340 | 8341 | 8342 | 8343 | 8344 | 8345 |
| 21 | 11,122 | 11,123 | 11,124 | 11,125 | 11,126 | 11,127 | 11,128 | 11,129 | 11,130 | 11,131 | 11,132 |

| Sub-stream | Fragment Sequence | | | | | | | | | |
|---|---|---|---|---|---|---|---|---|---|---|
| 0 | 2 | 3 | 4 | 5 | 6 | 7 | 8 | 0 | 1 | ... |
| 1 | 20 | 9 | 10 | 11 | 12 | 13 | 14 | 15 | 16 | ... |
| 2 | 32 | 33 | 34 | 35 | 36 | 21 | 22 | 23 | 24 | ... |
| 3 | 48 | 49 | 50 | 51 | 52 | 53 | 54 | 55 | 56 | ... |
| 4 | 69 | 70 | 71 | 72 | 73 | 74 | 75 | 76 | 77 | ... |
| 5 | 97 | 98 | 99 | 100 | 101 | 102 | 103 | 104 | 105 | ... |
| 6 | 134 | 135 | 136 | 137 | 138 | 139 | 140 | 141 | 142 | ... |
| 7 | 184 | 185 | 186 | 187 | 188 | 189 | 190 | 191 | 192 | ... |
| 8 | 250 | 251 | 252 | 253 | 254 | 255 | 256 | 257 | 258 | ... |
| 9 | 338 | 339 | 340 | 341 | 342 | 343 | 344 | 345 | 346 | ... |
| 10 | 456 | 457 | 458 | 459 | 460 | 461 | 462 | 463 | 464 | ... |
| 11 | 613 | 614 | 615 | 616 | 617 | 618 | 619 | 620 | 621 | ... |
| 12 | 822 | 823 | 824 | 825 | 826 | 827 | 828 | 829 | 830 | ... |
| 13 | 1101 | 1102 | 1103 | 1104 | 1105 | 1106 | 1107 | 1108 | 1109 | ... |
| 14 | 1473 | 1474 | 1475 | 1476 | 1477 | 1478 | 1479 | 1480 | 1481 | ... |
| 15 | 1969 | 1970 | 1971 | 1972 | 1973 | 1974 | 1975 | 1976 | 1977 | ... |
| 16 | 2630 | 2631 | 2632 | 2633 | 2634 | 2635 | 2636 | 2637 | 2638 | ... |
| 17 | 3512 | 3513 | 3514 | 3515 | 3516 | 3517 | 3518 | 3519 | 3520 | ... |
| 18 | 4688 | 4689 | 4690 | 4691 | 4692 | 4693 | 4694 | 4695 | 4696 | ... |
| 19 | 6256 | 6257 | 6258 | 6259 | 6260 | 6261 | 6262 | 6263 | 6264 | ... |
| 20 | 8346 | 8347 | 8348 | 8349 | 8350 | 8351 | 8352 | 8353 | 8354 | ... |
| 21 | 11,133 | 11,134 | 11,135 | 11,136 | 11,137 | 11,138 | 11,139 | 11,140 | 11,141 | ... |

Figure 5:
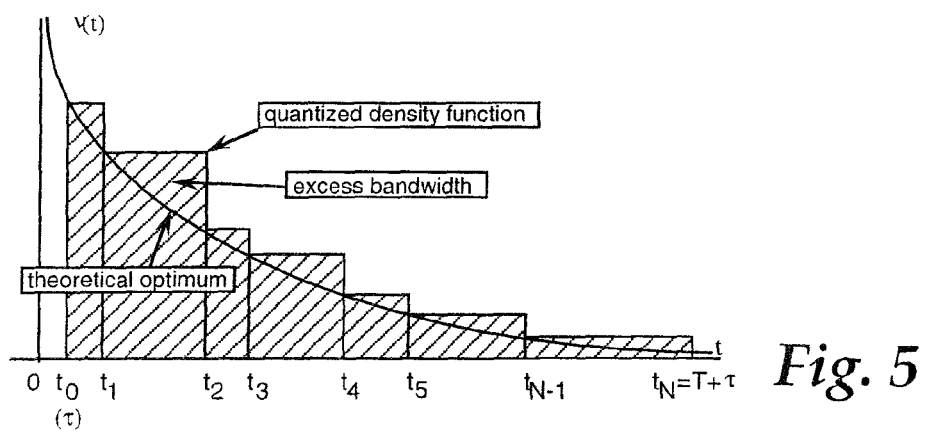
FIG. 5 is a plot of optimal and quantized fragment densities.

As noted previously, the quantization of the segments to contain an integral number of fragments results in excess bandwidth requirements beyond the theoretical optimum set forth in Equation 4. FIG. 5 illustrates the fragment density v(n) over the length of the data stream. The solid curve depicts the theoretical optimum, and the stepped levels indicate the quantized density function. The portion of each step which lies above the theoretical optimum represents the excess bandwidth that is required by the quantization.

Figure 6:
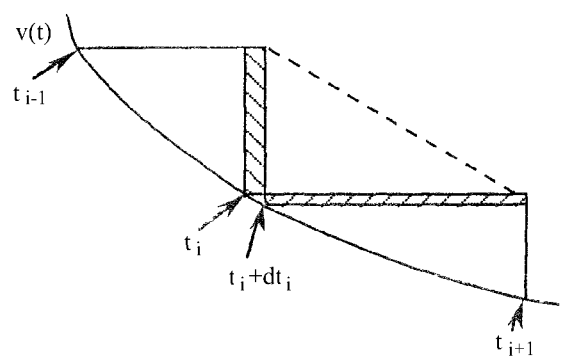
FIG. 6 is an enlarged view of a portion of the plot of FIG. 5, illustrating a differential change in the length of a presentation segment.

If the number of substreams N is known, it is possible to determine the length of each segment which provides the most efficient use of the available bandwidth. This determination can be carried out recursively by means of a differential analysis, in which the best choice for $t_i$, the starting point for segment i, is determined if $t_{i-1}$ and $t_{i+1}$ are known. Referring to FIG. 6, the bandwidth is at a local extremum when the two shaded areas in the diagram are of equal area, i.e., $$[v(t_{i-1}) - v(t_i)]dt_i = (t_{i+1} - t_i)[-v'(t_i)dt_i]. \quad (18)$$

Rearranging the terms indicates that the derivative of the grain density at $t_i$ must be equal to the slope of the dashed line in FIG. 6:

$$v'(t_i) = \frac{v(t_i) - v(t_{i-1})}{t_{i+1} - t_i} \quad (19)$$

From this relation, $t_{i+1}$ can be obtained as a recursion on $t_i$ and $t_{i-1}$:

$$t_{i+1} - t_i = \frac{v(t_i) - v(t_{i-1})}{v'(t_i)} \quad (20)$$

$$= -(t_i)^2 \left( \frac{1}{t_i} - \frac{1}{t_{i-1}} \right) \quad (21)$$

$$= -(t_i)\left( \frac{t_{i-1} - t_i}{t_{i-1}} \right) \quad (22)$$

$$t_{i+1}t_{i-1} - t_i t_{i-1} = t_i^2 - t_i t_{i-1} \quad (23)$$

$$\frac{t_{i+1}}{t_i} = \frac{t_i}{t_{i-1}} \quad (24)$$

The bandwidth used by a substream is $(t_{i+1} - t_i)v(t_i)B$, which simplifies to $[t_{i+1}/t_i) - 1]B$, a constant according to the recursion.

This analysis is based on the assumption that the data rate for a presentation is uniform. In practice, however, compressed data rates can vary in dependence upon the content of the presentation, wherein relatively still scenes may require significantly less than 3 Mb/s, whereas action-packed scenes might require more than 6 Mb/s. Therefore, it is more useful to express the foregoing relationship in terms of the fragments of a segment rather than the starting time of the segment.

The first fragment of a segment i is represented as $n_i$, and the segment i contains all of the fragments in the range $n_i$ to $n_{i+1}-1$. The fragment size G is the amount of memory required to represent one fragment of the presentation. A local extremum of the required bandwidth for a segment i can be expressed as the following induction rule:

$$0 = G \frac{d}{dn_i}[(n_i - n_{i-1})v(n_{i-1}) + (n_{i+1} - n_i)v(n_i)] \quad (25)$$

$$0 = v(n_{i-1}) - v(n_i) + (n_{i+1} - n_i)v'(n_i) \quad (26)$$

$$v'(n_i) = \frac{v(n_i) - v(n_{i-1})}{n_{i+1} - n_i} \quad (27)$$

The range $n_i$ to $n_{i+1}-1$ specifies which fragments should be transmitted in substream i. The time $t(n_i)$, the time after pressing "play" at which the lowest-numbered fragment is expected to be available, specifies the maximum length of time to transmit one full copy of segment i in its corresponding substream. Although the induction is derived with the values for $n_{i-1}$ and $n_{i+1}$ fixed and with $n_i$ as a variable, the induction can be used to compute $n_{i+1}$ from $n_{i-1}$ and $n_i$. This provides a way to compute $n_i$ inductively in ascending order, with only one free variable. In particular, since choosing $\tau$ fixes the curve $v(n)$, and by definition $n_0=0$, the number of fragments in the zeroth substream, $n_1$, can be regarded as the free variable. Given its choice, $n_2$ can be computed from $n_0$ and $n_1$, and so on.

One approach to choosing an appropriate encoding would be to iterate over all possible values of $n_1$, applying the induction recursive for each, and choosing the one that wastes the least bandwidth. However, this solution may not be preferable because the high-numbered values of $n_i$ are extremely sensitive to the choice of $n_1$. Iterating over values of $n_1$ could miss near-optimal solutions, especially since in the vast majority of candidate solutions generated in that manner, $n_N$ is not likely to match the length of the presentation.

A relaxation procedure is more preferably used to approximate the solution given above. First, locally optimal values are computed for the odd-numbered $n_i$'s, given the even-numbered values. Then locally optimal values for the even-numbered $n_i$'s are computed, given the odd-numbered values. This procedure is iteratively repeated until the bandwidth stops improving.

Playback

Figure 7:
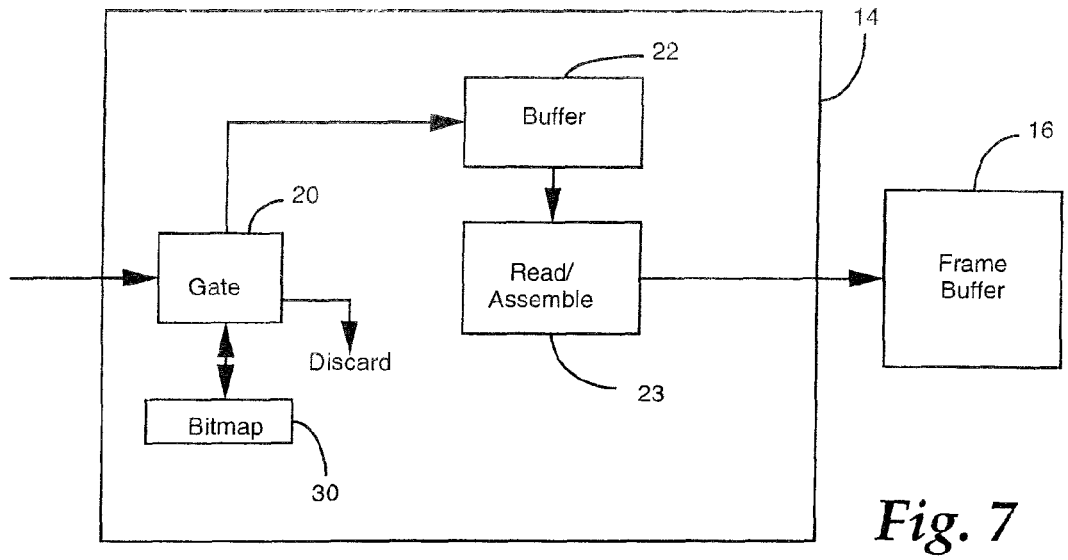
FIG. 7 is a block diagram of a first embodiment of a decoder for processing data that is transmitted in accordance with the present invention.

At the subscriber's premises, the multiplexed substreams are received and the fragments are reassembled in sequential order, to display the presentation. One embodiment of a decoder 14 for reassembling the encoded data is illustrated in FIG. 7. The received data is first presented to a gate 20, which determines whether a copy of each fragment has been received since the user entered a request to view the presentation. If a given fragment has not been received since the subscriber's request, it is forwarded to a buffer 22. If, however, a copy of the fragment has been previously received and stored in the buffer, all subsequent copies of that fragment are discarded.

Figure 8:
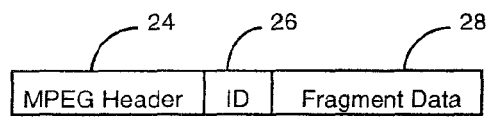
FIG. 8 is an illustration of a format for transmitting one fragment of data.

In order for the incoming signal stream to be correctly decoded, the gate must be able to identify each fragment that is being received, regardless of when the subscriber enters the request to view the presentation. In one embodiment of the invention, an identifier is included with each transmitted copy of a fragment. FIG. 8 illustrates one possible format of a data packet for the transmission of fragments. To minimize bandwidth requirements, the presentation data is compressed, for example in accordance with the MPEG standard. The data packet for a fragment therefore begins with a header 24 which conforms with the MPEG standard. Following the header, a fragment identifier 26 is transmitted. In a straightforward implementation, the identifier could be the integer index n which indicates the location of the fragment in the total data sequence. In other words, the first fragment in the presentation has an identifier of 0, the next fragment is identified as 1, etc. Alternatively, the identifier could be a code value which the gate 20 uses to look up the index number, by means of a previously downloaded look-up table. This latter implementation might be preferable as a mechanism for restricting access to authorized subscribers.

In addition to the index number or code value for the specific fragment being transmitted, the identification data could also include a program identification, or PID, which indicates the presentation to which that fragment belongs. In many cases, the PID for a presentation is incorporated into the MPEG header information. In the event that it is not, however, it can be included with the identifier portion 26 of the transmitted data. Following the identifier 26, the actual data 28 for the fragment is transmitted. In one embodiment of the invention, the total length of the data packet, including the header and identification data, is 188 bytes.

At the receiver, the gate 20 first examines the PID to determine whether a received fragment belongs to the presentation that has been requested. If the PID is correct, the gate examines the fragment identifier and determines whether that fragment has been previously stored in the buffer 22. For example, the gate might have an associated bitmap 30, in which sequential bit positions respectively correspond to the fragments of the presentation. When a subscriber enters a request to view a presentation, the bitmap is reset so that all bits contain the same value, e.g., zero. As each fragment is received at the gate 20, the bitmap is checked to determine whether the bit corresponding to that fragment's index number has been set. If not, i.e., the value is still zero, the fragment data is forwarded to the buffer 22, for storage, and the bit is set in the bitmap 30. Once the bit has been set, all subsequent copies of that fragment are discarded by the gate 20.

Thereafter, at a time no later than $\tau$ seconds after the user has entered a request to view the presentation, a read circuit 23 retrieves the fragments stored in the buffer 22 in sequential order, and successively feeds them to the frame buffer 16 at the proper video rates. The encoding of the substreams ensures that at least one copy of each fragment will have been received by the time that it is required for presentation to the frame buffer 16. Thus, with a maximum wait time of $\tau$ seconds, the subscriber is able to view the complete presentation, from start to finish.

In practice, the first copy of each fragment that is received after the subscriber enters a request to view the presentation is stored in the buffer 22. Hence, for at least a short period immediately after the request is entered, every received fragment in each substream is going to be stored. Thereafter, as copies of the fragments begin to be repeated, the received fragments are selectively discarded. For instance, in the exemplary encoding depicted in preceding Table 1, every incoming fragment is stored for the first nine time slots. Thereafter, as segments begin to repeat, the rate of storage into the buffer 22 begins to decrease.

Figure 9:
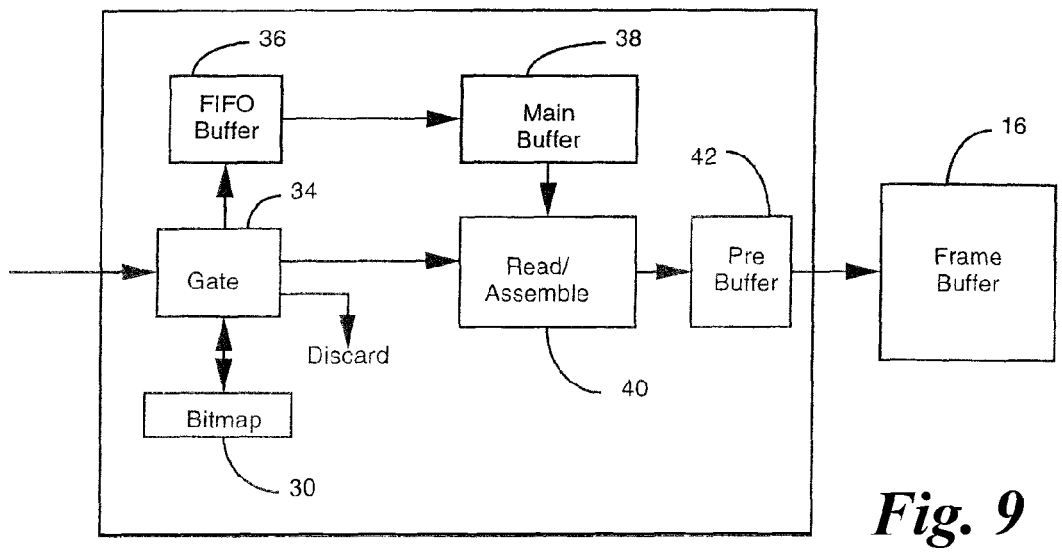
FIG. 9 is a block diagram of a second embodiment of the decoder.

In the embodiment of FIG. 7, the buffer 22 must be capable of writing the data at the rate provided by the gate 20. Hence, it must be capable of operating at the maximum bit rate for transmission. It may not be desirable, or economically feasible, to utilize memory which is capable of operating at such a rate, and which also has sufficient capacity to store all of the fragments that will be needed. An alternative embodiment of the decoder, which permits a slower form of storage to be employed, such as a magnetic hard disk, is illustrated in FIG. 9. In this embodiment, a gate 34 receives each incoming fragment and selectively determines whether it is to be kept or discarded. Fragments which are to be kept are forwarded to a fast FIFO buffer 36, which is capable of writing data at the rate provided by the gate. This data is then forwarded to a main buffer 38 at a slower rate, for storage until needed. In this embodiment, the main buffer 38 is sufficiently large to store all of the necessary fragments, up to the entire length of the presentation, and the fast FIFO buffer 36 can be much smaller. In an alternate embodiment, fragments are discarded after being viewed. In this case, the main buffer 38 only needs to be large enough to store a limited portion of the presentation at one time, e.g. 44% of the fragments.

As a further feature of this embodiment, the gate 34 can make a determination whether fragments that are to be kept will spend a negligible length of time in the buffers. For instance, immediately after the subscriber enters a request to view the presentation, the lowest numbered fragments will be needed right away, to begin the playback of the presentation.

Later in the presentation, other fragments may arrive just in time for display as well. In this case, therefore, the gate can forward these fragments directly to the read/assembly circuit 40, so that they are immediately available for display. To do so, the gate might be provided with a running clock (not shown) that indicates the number of the current fragment that is being displayed. If an incoming fragment is within a certain range of that number, it is directly forwarded to the read/assembly circuit 40.

In this mode of operation, the read circuit may receive fragments out of their sequential order. To accommodate this situation, a pre-buffer 42 is located between the read/assembly circuit and the frame buffer 16. This pre-buffer provides random access writing capability, and sequential readout to the frame buffer 16.

To utilize the broadcast-video-on-demand capability provided by the present invention, it is necessary, therefore, that there be sufficient local storage capacity at the subscriber's premises to store and reassemble the fragments from the encoded transmissions. In some cases, however, viewers who do not have such storage capacity may also desire to see the presentation in a non-demand, or conventional, manner. To accommodate this situation, as well as provide additional advantages, discussed below, the bandwidth allocated to the presentation is increased by the amount necessary to transmit the presentation in a conventional manner, e.g., in a sequential form at the nominal rate of 3 Mb/s. In the conventional transmission, therefore, the fragments are not transmitted at different rates, so that every fragment has the same repetition period, which is approximately equal to T.

For the exemplary encoding depicted in the foregoing table, in which the bandwidth multiplier $\eta=7.3$, the addition of the conventional broadcast increases the multiplier to a value of $\eta=8.3$. In other words, a total bandwidth of 25 Mb/s would be allocated to the presentation. It is to be noted that, using known QAM-64 techniques, it is possible to transmit data at a rate of approximately 27 Mb/s within a 6 MHZ channel band. Thus, both a conventional transmission of a 2-hour movie and an encoded transmission with a maximum wait time of 15 seconds can be broadcast within the bandwidth of a single television channel. Throughout the following discussion, embodiments of the invention in which a conventional, sequentially ordered copy of a presentation is transmitted with the encoded substreams are identified as "layered" transmissions, i.e. one layer of substreams consists of the encoded data, and another layer comprises the sequential data.

Periodic Transmission

In the transmission of the reordered data fragments, it is preferable that the encoding of the presentation be periodic. In other words, the data in all of the substreams should repeat at regular intervals. If the encoding meets this condition, the presentation source 10 only needs to store one period of the encoding. Otherwise, it will be necessary to either store, or generate in real time, an encoding that is long enough to provide continuous service.

Figure 10A:
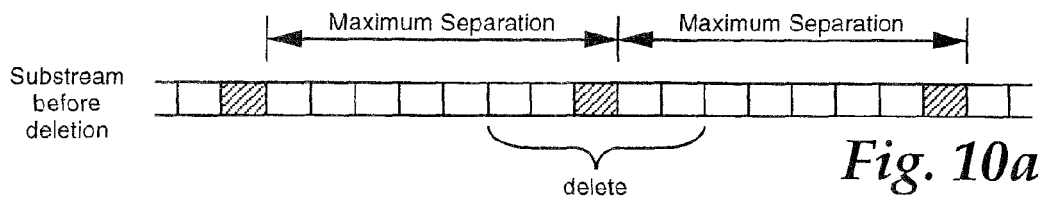
FIGS. 10$a$-10$c$ illustrate the concepts which underlie the deletion of fragments from substreams and the use of proxy fragments.
Figure 10B:
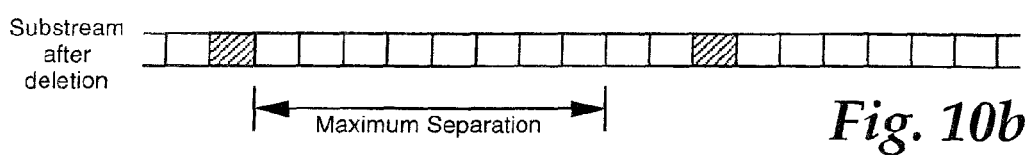

Furthermore, it is preferable to have the period of the encoding be related to the length T of the presentation. In such a case, where a conventional layer of the presentation accompanies the encoded layer, as described previously, they can be transmitted together with the same periodicity. This is accomplished by modifying each encoded substream to have a period which is approximately equal to T. To illustrate the manner in which this can be accomplished, a section of one substream which contains enough copies of a segment to span the period T is considered. If the length of that section exceeds the period T, a portion of one segment is deleted from the substream. If the conventionally transmitted version of the presentation does not accompany the encoded version, the deletion of a portion of one segment would violate the condition set forth in relationship (2), since the density of fragments in the deleted portion would be insufficient. For instance, FIG. 10*a* illustrates a substream that complies with the conditions of relationship (2). In this substream, a given fragment, indicated by the shaded area, periodically appears in the substream. The maximum separation between successive copies of the fragment complies with the density requirements of relationship (2). FIG. 10*b* illustrates a modified substream, in which a portion of a segment, which includes the given fragment, has been deleted. As can be seen, the distance between successive copies of the given fragment exceeds the maximum separation permitted by relationship (2).

Figure 10C:
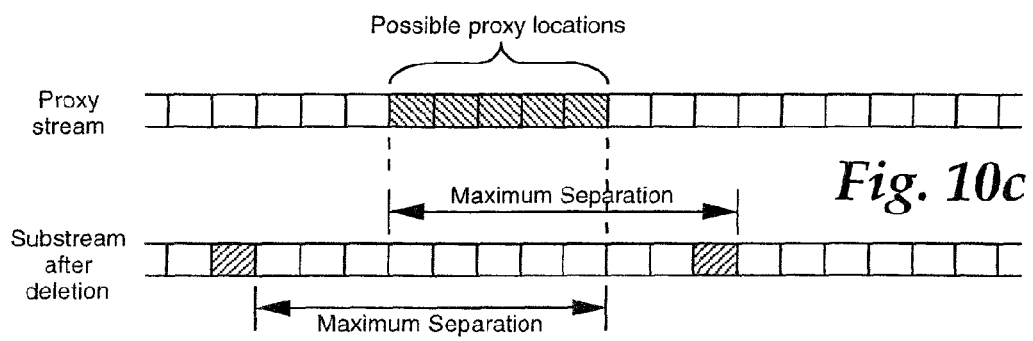

However, it is possible to delete a portion of a segment if, for each deleted fragment, a copy of that same fragment is present at an appropriate location in another substream. In the context of this disclosure, a copy of a fragment that is present in another substream is called a "proxy". In a practical implementation of the invention, the conventionally transmitted presentation can be used to provide proxies for deleted portions of encoded substreams. Referring to FIG. 10*c*, when a proxy is present, it is possible to delete fragments if, for each deleted fragment, a proxy begins no earlier than one maximum separation period before the end of the next fragment copy in the substream, and ends no later than one maximum separation after the end of the previous copy of the fragment. This requirement ensures that the fragment, or its proxy, fulfills the density conditions of relationship (2). The possible locations of a proxy, for the deleted fragment of FIG. 10*b*, are illustrated in FIG. 10*c*. As long as a copy of the deleted fragment is present in the proxy stream at one of these locations, it can be deleted from the original substream, since one copy will still be received at the subscriber's premises by the required time.

When multiple contiguous fragments are deleted within a segment, this condition can be characterized more generally. If the number of fragments to be deleted from a substream i is denoted as $d_i$, then a copy of fragment j can be deleted from substream i only if a proxy exists in another substream with an offset $\Delta$ that lies in the range $0 \le \Delta \le d_i$. A proxy offset is defined as the column number, or transmission time slot, of the fragment copy to be deleted, minus the column number of the copy which serves as a proxy.

Figure 11:
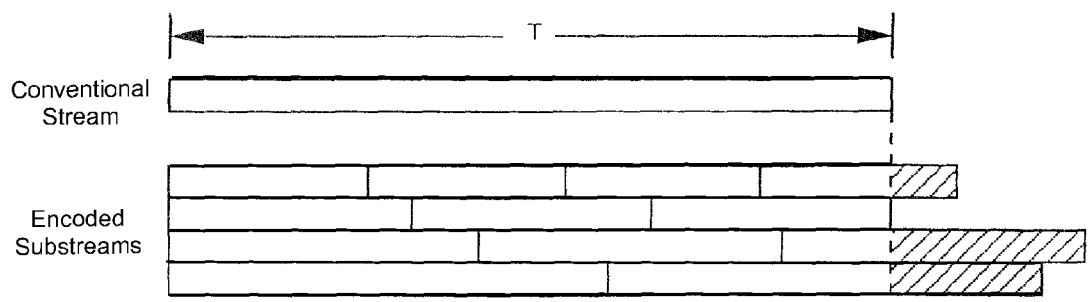
FIG. 11 illustrates the relationship of encoded substreams to a conventional stream.
Figure 12:
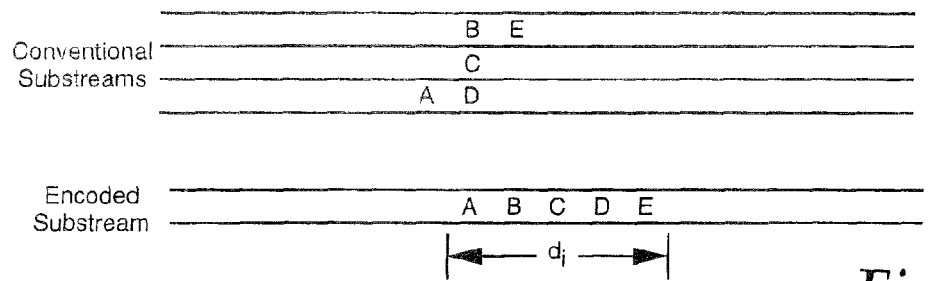
FIG. 12 illustrates the alignment of deleted fragments relative to proxy fragments in a conventional stream.

Through the use of proxies in this manner, each substream can be modified to provide it with periodicity T. FIG. 11 illustrates an example of encoded substreams that are transmitted together with a conventional stream. To modify the encoded substreams to provide periodicity T requires that up to one full segment, minus one fragment, may need to be deleted from each encoded substream. If the fragments are deleted after the end of the period T, as indicated by the shading, the requirements of relationship (2) may be violated. However, the encoded substreams can be time shifted to permit deletion of a portion of a segment, and utilize proxies from the conventional stream. Referring to FIG. 12, the fragments are arranged in ascending sequential order within each segment of an encoded substream. In the substream, a target range of five fragments, identified as A-E, is to be deleted, so that $d_i=5$. The substream is time shifted so that a copy of the first fragment in the target range, i.e., fragment A, is aligned with a copy of any fragment in the conventional stream that is within the target range. In this particular example, the conventional stream is time-division multiplexed over three substreams.

Regardless of how the encoded substream is time shifted relative to the conventional stream, the first fragment always has the smallest proxy offset, and the last fragment always has the largest proxy offset. Since the first fragment's proxy offset cannot be negative, and the last fragment's proxy offset cannot exceed $d_r-1$, every proxy offset is within the required range. In the illustrated example, fragment A has an offset of one, and fragment E has an offset of 3, which meets the requirements for removal of fragments. Thus, through appropriate deletion of portions of segments, and time shifting of the conventional stream and the substreams relative to one another to properly align the proxies of the deleted fragments, it is possible to ensure that each encoded substream has a periodicity T.

In a case of a layered transmission, the periodicity of each substream can be made approximately equal to the total running time T of the presentation. If layering is not employed, the periodicity of the encoded substreams can be made smaller than T. In this case, however, one or more additional substreams, which function as proxy substreams, need to be transmitted. Each encoded substream can be modified to have a desired periodicity, R, if a number of fragments equal to $\gamma(t(n) \bmod R)$ are deleted from the substream. The length of the repeating portion of the substream is equal to t(n), and $\gamma$ is equal to the number of fragments that can be transmitted per unit time at bandwidth $\lambda \eta$. For a given R, therefore, the proxy substream must contain P fragments, where $P=\gamma\Sigma_n(t(n) \bmod R)$. Since $\gamma(t(n) \bmod R)$ falls within the range $(0, \gamma t(n))$, the value for P therefore lies in the range $(0, \gamma T-N)$. The proxy fragments can therefore be transmitted in a number of proxy substreams equal to the smallest integer at least as large as P/R. In most cases, the proxy substreams will not be full, which permits the required bandwidth to decrease when no proxy fragments are needed. It is possible to employ proxies for up to half of the encoded fragments. As a result, encodings with periodicities which are considerably less than 0.5 T can be accomplished.

Switching of Presentations

Figure 13:
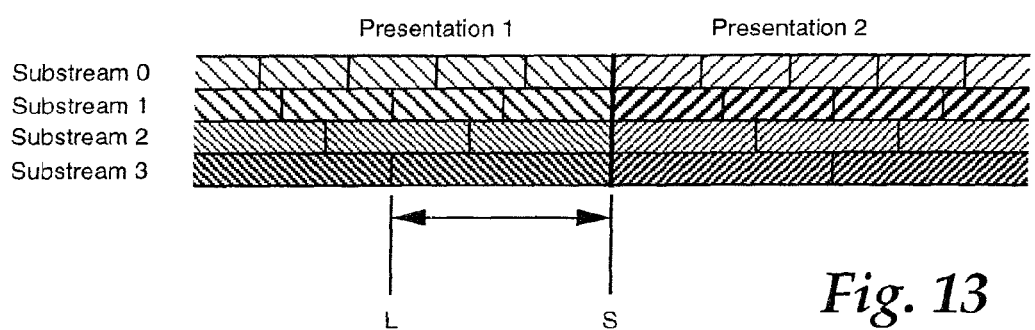
FIG. 13 illustrates the switching of encoded substreams from one presentation to another.

As long as an encoded presentation is continuously transmitted in such a periodic fashion, a subscriber can view or otherwise utilize a presentation at any arbitrary time, with a maximum wait time of $\tau$. In a practical implementation, however, the providers of broadcast services will need to terminate the transmission of an encoded presentation, to change to a new presentation. For instance, in a subscription television system, movies may be changed on a daily or weekly basis. Consequently, at a given point the encoded transmission of one movie will terminate, and the transmissions of the next movie will commence. This situation is schematically illustrated in FIG. 13, for an example where each presentation is transmitted over four substreams. Vertical lines within a substream indicate the boundaries between repeated segments. For illustrative purposes, the segments are illustrated so that their boundaries align at the time S when the switch is made from one presentation to the other.

When this switch occurs, there exists a period of time during which a subscriber cannot enter a request to view the first movie and be able to receive the entirety of that movie. This period begins when the last copy of any fragment in the first presentation is received at the subscriber's premises. If the subscriber presses the "play" button any time after the point at which it is possible to capture that copy of the fragment in its entirety, it is not possible to view the complete presentation. As a practical matter, this period of time has a duration which is equal to the length of the longest segment. In a further aspect of the invention, this period of time is minimized, to thereby reduce the length of time that a subscriber is prohibited from the viewing the first movie in its entirety and must wait for the start of the second movie.

Figure 14:
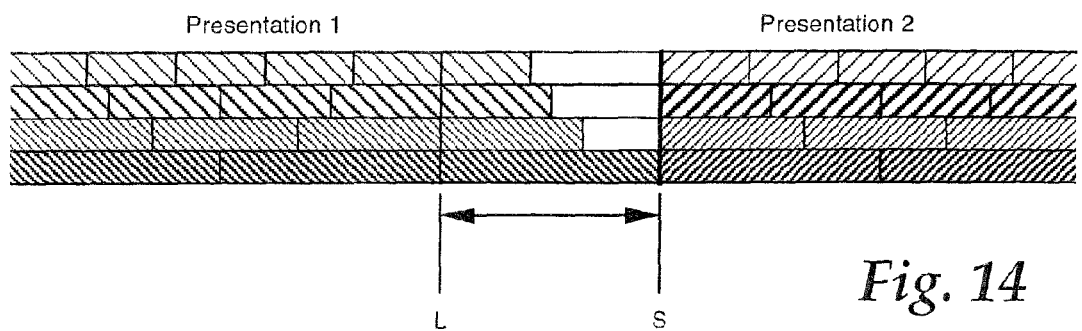
FIG. 14 is an alternative illustration of the switching of encoded substreams from one presentation to another.
Figure 15:
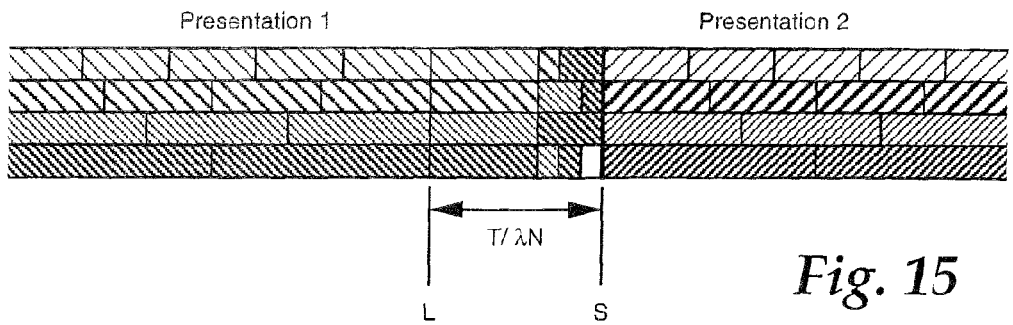
FIG. 15 is an illustration of a first embodiment of switching which employs reordered fragments, without a conventional layer.

The last point in time at which the user can press the "play" button and still view the presentation in its entirety, before the switch to a new presentation, is designated as the point L. Beginning at this point, it is only necessary to receive one copy of each fragment, to ensure that the entire presentation can be viewed in response to any actuation of the "play" button up to the point L. Any additional copies of fragments that are transmitted after this time will not be used, and are therefore unnecessary. FIG. 14 illustrates the transmission of one copy of each fragment, i.e. one complete segment, in each substream, beginning at time L. As indicated by the blank areas, there is unused capacity in all but the highest-numbered substream. If each segment continues to be repetitively transmitted, this unused capacity is occupied by redundant copies of presentation segments. One way to reduce the duration of the period between L and S, therefore, is to move some of the fragments from the higher-numbered substreams into the available bandwidth of lower-numbered substreams, so that exactly one copy of each fragment is transmitted after the point L, using the full available bandwidth, as depicted in FIG. 15.

In so doing, however, attention must be paid to the order in which the fragments are transmitted, to ensure that the fragment density requirements of relationship (2) are maintained. A straightforward approach that can be employed to ensure this condition is to time-division multiplex the substreams in their usual order, but to omit redundant copies of fragments. This approach guarantees that every fragment will be at least as close to the last start time L as it was before the redundant fragments were deleted. The transmission of the last fragment $n_{max}$ marks the point S at which the transmission of the encoded substreams for the new presentation can begin. In an un-layered embodiment of the invention, the reordering of the fragments in this manner provides a time period S-L that has a duration of T/$\lambda$N. In the case of the sample encoding depicted in Table 1 for a two hour movie, this results in a period of about 16.5 minutes during which the subscriber cannot begin the playback of either movie.

Figure 16:
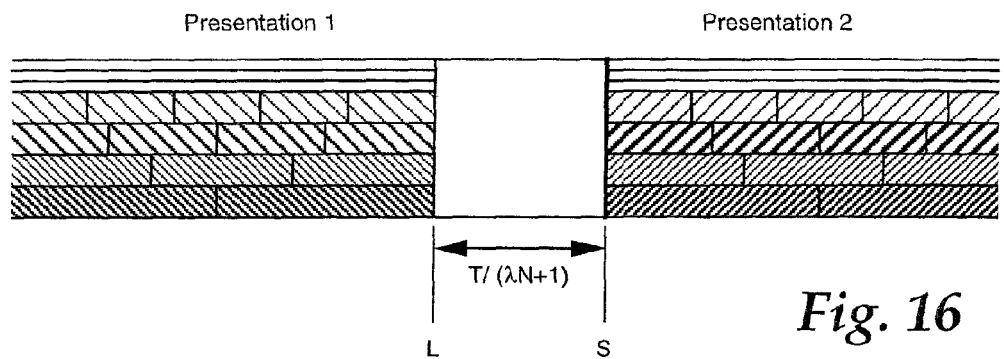
FIG. 16 illustrates a second embodiment of switching with reordered fragments, which includes a non-contiguous conventional layer.
Figure 17:
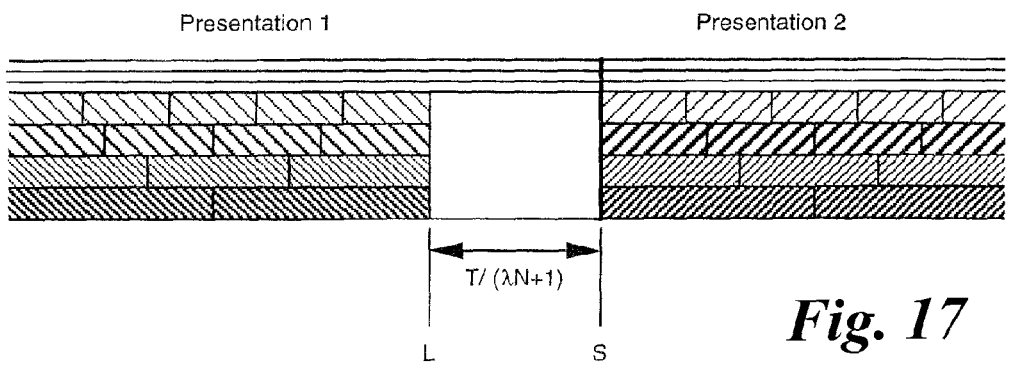
FIG. 17 illustrates another embodiment of switching with reordered fragments, which employs a contiguous conventional layer.

In the case of a layered embodiment, the additional bandwidth provided by the conventional layer permits this period of time to be reduced even more. Two alternative approaches are possible, as respectively illustrated in FIGS. 16 and 17. In these figures, the conventional transmission is depicted by the horizontal layers on top of the encoded substreams. FIG. 16 illustrates the situation in which the final transmission of each fragment, represented by the shaded area, occurs after the conventional transmission has terminated. In this case, the bandwidth normally allocated to the conventional layer can also be used for the encoded transmission. In other words, the encoded transmission has a total available bandwidth of ($\lambda$N+ 1)$\eta$. Consequently, the period S-L is reduced to a duration of T/($\lambda$N+1). In the case of the sample encoding, therefore, this results in a non-viewing period of about 14.5 minutes for a two hour movie.

Of course, the implementation of FIG. 16 means that the conventional viewing of the movie also has the same blackout period. In the alternative implementation of FIG. 17, the bandwidth allocated to the last copy of each fragment is reduced, so that the conventional presentations can abut one another. This approach would appear to have the same effect as the non-layered approach of FIG. 15, and lengthen the period S-L to T/$\lambda$N for the encoded version of the presentation. However, using the conventional stream as a proxy, a sufficient number of fragments can be removed from the encoded portion of the transmission to provide a non-viewing period of duration $T/(\lambda N+1)$. In essence, all of the fragments in the last $T/(\lambda N+1)$ seconds of the presentation are available from the conventional layer, and are received at least as early as they would be in the highest-numbered substream. Consequently, they can be omitted from the encoded substreams, thereby shortening the period of time necessary to transmit one copy of every fragment.

Figure 18:
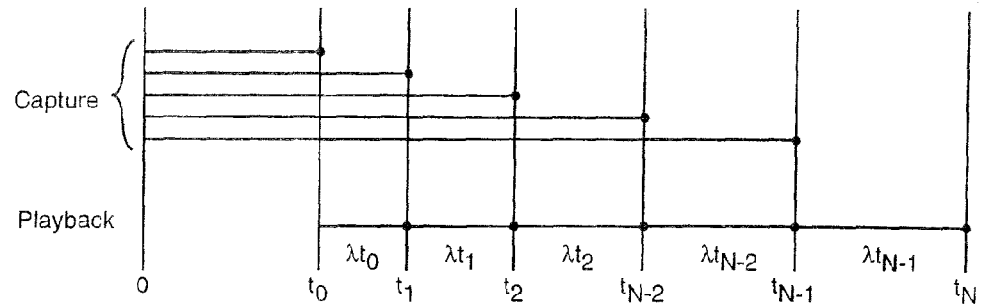
FIG. 18 is a time diagram illustrating the relationship between the receipt and play of fragments.

In each of the foregoing embodiments, the boundary between the first presentation and the second presentation occurs at the same time S for all of the substreams. In an alternative implementation, different switching times are employed for each substream. Referring again to FIG. 14, it can be seen that the bandwidth requirements for the first presentation are reduced as the transmission of each segment is completed. These reduced bandwidth requirements can be used to simultaneously ramp up the bandwidth that becomes available for the second presentation. To illustrate, FIG. 18 depicts the time relationship of the substreams for an encoded transmission. In this diagram, time t=0 is the moment at which the subscriber presses the "play" button. As soon as this event occurs, copies of the fragments are captured from all of the various substreams. In particular, the capturing operation does not need to wait until the first fragment of the substream appears on its designated substream. The fragments are retrieved in the order in which they appear, beginning at time 0. Furthermore, the playback does not begin as soon as the first fragment has been received. Rather, to guarantee uninterrupted display of the presentation, the playback of a segment i start begins after one full copy of that segment has been transmitted over the time period $\tau(1+\lambda)^i$ from time 0. Thus, the playback of the first segment begins when the time period $\tau$ has elapsed, at time $t_0$, once one copy of each fragment in that segment has been received.

For any given segment i, a full copy of that segment is received between time 0 and time $t_i$, and plays from time $t_i$ to time $t_{i+1}$, which defines an interval of duration $\lambda t_i$. However, each segment is transmitted over the interval of time $\tau(1+\lambda)^i$ which is as long as the sum of the viewing times of all preceding segments, plus the wait time $\tau$. Thus, each segment can be transmitted much more slowly than its own viewing time.

Figure 19:
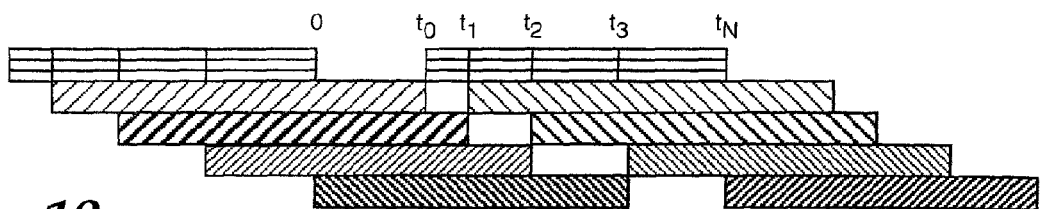
FIG. 19 is an illustration of switching with a conventional layer, using irregular stop and start boundaries.

In the layered implementation, the first required copy of each fragment appears in the conventional layer. Consequently, the transmission of an encoded segment i need not begin until time $t_{i+1}$ in order to meet the conditions of relationship (2). As a result, the substreams of the second presentation can start with an irregular boundary that complements the irregular termination boundary of the first presentation, as depicted in FIG. 19, with sufficient room between them to avoid problems. Specifically, substream i of the first presentation must play until time $t_i$, and substream i of the second presentation need not start until time $t_{i+1}$. If the two presentations have identical encodings, e.g., they are both movies of the same length, then the inter-substream gap between the end of the first presentation and the beginning of the second presentation is $\lambda t_i$. Otherwise, the gap is $(t_{i+1})-t_i$, where $t_{i+1}$ is determined relative to the encoding of the second presentation, and $t_i$ is determined with respect to the encoding of the first presentation.

An exemplary encoding for a movie which incorporates the foregoing concepts will now be described. As in the example of Table 1, a two-hour movie is considered. The movie is divided into fragments of 188 bytes each, resulting in approximately 14.4 million fragments. The value for $\lambda$ is chosen to be $\frac{1}{25}$, and the bandwidth multiplier is approximately equal to 8. Consequently, 25 substreams are allocated to the conventional transmission of the movie, and the number of encoded substreams N=175. Pursuant to Equation 8, the wait time t is a function of the movie length, and is approximately 7.5 seconds. Given these parameters, therefore, the first two segments of the movie contain 602 and 627 fragments, respectively.

The encoding of the movie is created by time-division multiplexing the 175 encoded substreams with the $1/\lambda=25$ conventional substreams. As in the example of Table 1, the individual substreams are represented by the rows of the table, and each column represents one transmission slot. For the conventional transmission, the fragments of the presentation are allocated to the 25 substreams in raster order, as depicted in Table 2 below.

TABLE 2

| Substream | Fragment Sequence | | | | | | | | | | |
|---|---|---|---|---|---|---|---|---|---|---|---|
| 0 | 0 | 25 | 50 | 75 | 100 | 125 | 150 | 175 | 200 | 225 | • • • |
| 1 | 1 | 26 | 51 | 76 | 101 | 126 | 151 | 176 | 201 | 226 | • • • |
| 2 | 2 | 27 | 52 | 77 | 102 | 127 | 152 | 177 | 202 | 227 | • • • |
| 3 | 3 | 28 | 53 | 78 | 103 | 128 | 153 | 178 | 203 | 228 | • • • |
| 4 | 4 | 29 | 54 | 79 | 104 | 129 | 154 | 179 | 204 | 229 | • • • |
| 5 | 5 | 30 | 55 | 80 | 105 | 130 | 155 | 180 | 205 | 230 | • • • |
| • | • | • | • | • | • | • | • | • | • | • | |
| • | • | • | • | • | • | • | • | • | • | • | |
| • | • | • | • | • | • | • | • | • | • | • | |

The encoded substreams begin at Substream 25 in this example. The assignment of the fragments to the encoded substreams is carried out with reference to the fragments in the conventional substreams. The first encoded substream contains fragments 0 through 601. To determine its appropriate location, fragment 601 is identified in the conventional substream. Beginning in the next column, i.e. transmission slot, of the encoded substream, fragments 0-601 are sequentially inserted, and this sequence is repeated until one segment length beyond the end of the conventional data stream. This encoding is depicted in Table 3 below.

TABLE 3

| | Fragment Sequence | | | | | | | | | | |
|---|---|---|---|---|---|---|---|---|---|---|---|
| Conventional | 500 | 525 | 550 | 575 | 600 | 625 | 650 | 675 | 700 | 725 | • • • |
| Substreams | 501 | 526 | 551 | 576 | 601 | 626 | 651 | 676 | 701 | 726 | • • • |

TABLE 3-continued

| | Fragment Sequence | | | | | | | | | | |
|---|---|---|---|---|---|---|---|---|---|---|---|
| 0-24 | 502 | 527 | 552 | 577 | 620 | 627 | 652 | 677 | 702 | 727 | ... |
| | . | . | . | . | . | . | . | . | . | . | . |
| | . | . | . | . | . | . | . | . | . | . | . |
| | . | . | . | . | . | . | . | . | . | . | . |
| | 523 | 548 | 573 | 598 | 623 | 648 | 673 | 698 | 723 | 748 | ... |
| | 524 | 549 | 574 | 599 | 624 | 649 | 674 | 699 | 724 | 749 | ... |
| Substream 25 | | | | | | 0 | 1 | 2 | 3 | 4 | ... |
| Conventional Substreams 0-24 | 15,600 | 15,625 | ##### | 15,675 | ##### | ##### | | | | | ... |
| | 15,601 | 15,626 | ##### | 15,676 | ##### | ##### | | | | | ... |
| | 15,602 | 15,627 | ##### | 15,677 | ##### | ##### | | | | | ... |
| | . | . | . | . | . | . | | | | | ... |
| | . | . | . | . | . | . | | | | | ... |
| | . | . | . | . | . | . | | | | | ... |
| | 15,623 | 15,648 | ##### | 15,698 | ##### | ##### | | | | | |
| | 15,624 | 15,649 | ##### | 15,699 | ##### | ##### | | | | | |
| Substream 25 | 599 | 600 | 601 | 0 | 1 | 2 | | | | | ... |

The foregoing examples are presented for the case in which the bandwidth requirements are uniform, such that the temporal spacing of fragments is the same for all segments of the presentation. As noted previously, however, the data rates, and hence the bandwidth requirements, can vary in dependence upon the content of the presentation. As a result, one segment of the presentation may require a significantly greater number of fragments to be transmitted in a given time than another segment of the movie. When the fragments of these two segments are multiplexed, consideration must be given to these differing data rates.

In accordance with another aspect of the present invention, a technique identified as periodic-queue time-division multiplexing is employed to accommodate variable rate data streams. Each substream comprises a series of events, where each event is the beginning of the transmission of a fragment. Each event is associated with a nominal time, and within a given substream the nominal times occur at regular intervals. The length of that interval, which is therefore equal to the temporal length of a fragment, can be expressed as follows:

$$\Delta t_i = \frac{t(n_i)}{n_{i+1} - n_i} \quad (28)$$

where: $t(n_i)$ is the temporal length of segment i, and $n_{i+1} - n_i$ is the number of fragments in segment i.

The value of $\Delta t_i$ can be different for different values of i, i.e. different substreams, in the case of variable bandwidths.

Figure 20:
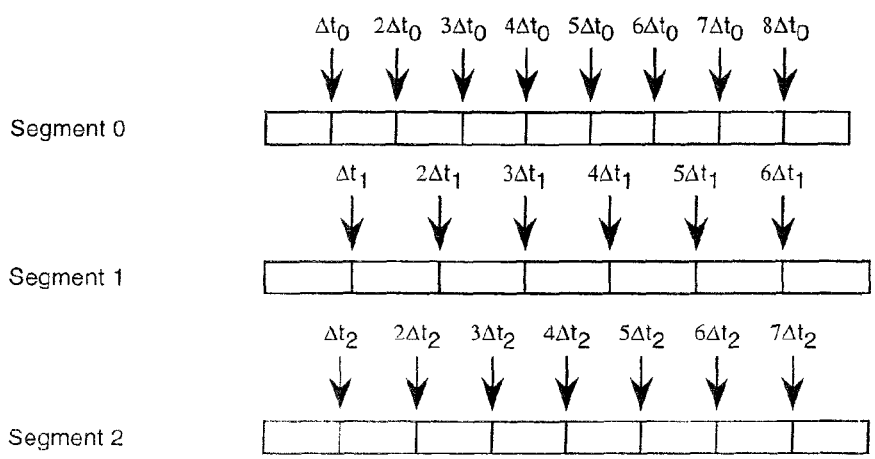
FIG. 20 is an illustration of the assignment of nominal times to fragments.

The objective of periodic-queue time-division multiplexing is to assign each event an actual transmission time such that, when the events from all of the substreams are multiplexed together, the actual times occur at regular intervals. This is accomplished by assigning each fragment a nominal broadcast time. FIG. 20 illustrates the nominal times that are assigned to the fragments in three segments having different nominal time intervals $\Delta t_i$. Once the nominal times have been assigned, the fragments are sorted in order of nominal time. In the case of ties, the fragments with the same nominal time can be arbitrarily ordered, e.g., in accordance with their segment number. The fragments are then transmitted in the sorted order at equally spaced actual times, to provide a fixed data rate. The interval $\Delta t_{max}$ between the actual times is chosen as the harmonic mean of the nominal time intervals:

$$\frac{1}{\Delta t_{max}} = \sum_i \frac{i}{\Delta t_i} \quad (29)$$

As a result, each of the fragments is broadcast, on average, at the appropriate frequency. Furthermore, the difference in the nominal-time interval between any two events, e.g. successive copies of the same fragment, and the actual-time interval between those same events is bounded. For any two events whose nominal times are separated by a duration t, the number of intervening events that occur within each substream k is an integer $(t/\Delta t_k)+\delta_k$, where $\delta_k$ is a real-valued number in the range $(-1, +1)$. The total number of intervening events from the entire data stream is therefore $(t/\Delta t_{max})+\Sigma_k \delta_k$. Consequently, the actual-time difference between two events differs from the nominal time difference, t, by the quantity $t/\Delta t_{max}\Sigma_k\delta_k$. This quantity lies within the range $(-N\Delta t_{max}, +N\Delta t_{max})$. In other words, for any two events, the difference between the actual and nominal times is bounded by N units of $\Delta t_{max}$. Hence, the cost associated with the ability to provide a constant bandwidth data stream is an increase of the actual wait time, beyond the nominal wait time $\tau$, by a quantity $(N-1)\Delta t_{max}$, where $\Delta t_{max}=G/\eta m$. For the example described in connection with Tables 2 and 3, this amounts to an increase of about 12.5 ms.

When a program switch occurs, the number of substreams N might change if the two programs are not of the same length. Further, if the embodiment of FIG. 19 is employed, the various substreams stop and start at staggered times. The periodic-queue time-division multiplexing technique should be applied in a manner which takes these factors into consideration. To do so, a grid such as those of Tables 2 and 3 is defined, having an infinite number of columns and a number of rows equal to the maximum anticipated value of N. The fragments of the presentations are then scan-converted into the grid in order of nominal times, using only those cells which correspond to substreams that are currently active. Referring to FIG. 19, for example, during the period from time 0 to $t_0$, no fragments are placed in the rows of the grid which pertain to the conventional substreams, i.e. rows 0-24 in the example of Table 3. At time $t_0$, the fragments of the second conventional presentation begin to be loaded. At this same time, encoded fragments from the first presentation are no longer loaded into the next row, e.g. row 25, although they continue to be loaded into all subsequent rows. At time $t_1$, the fragments of the second presentation begin to be loaded into row 25, and fragments of the first presentation are no longer loaded into row 26. The process continues in this manner, until a complete switch from the first to the second presentation has taken place.

From the foregoing, therefore, it can be seen that the present invention provides the ability to broadcast temporally ordered data in a manner which enables a user to utilize that data with a minimal waiting period, regardless of the point in time at which the request to utilize the data is made. In its application to the transmission of video presentations, a user is able to begin viewing a two hour movie with a maximum wait time of approximately 7.5 seconds. Using currently available transmission techniques, these results can be accomplished within the bandwidth that is allocated to a conventional television channel, while at the same time permitting a conventional transmission of the movie to take place as well. Hence, every available television channel is capable of providing a different movie in both a conventional mode and a video-on-demand mode. The number of different movies that can be viewed in the video-on-demand mode is not limited by the storage capacities at the viewer's site. Rather, it is determined only by the number of channels that the television service provider allocates to the movies.

Figure 21:
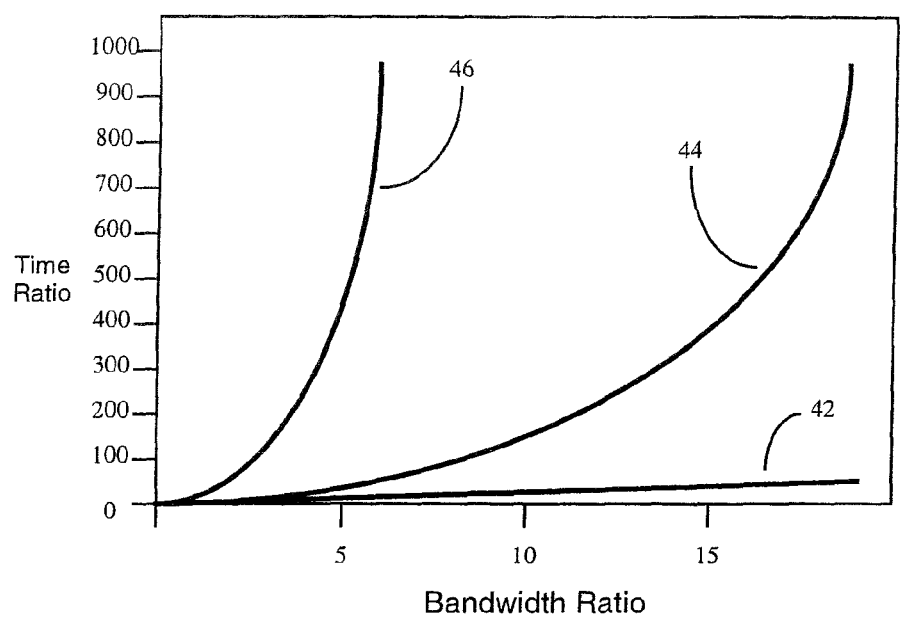
FIG. 21 is a graph depicting the results obtained by different broadcast techniques.

The efficiency of the present invention can be readily ascertained by reference to two dimensionless parameters, bandwidth ratio and time ratio. The bandwidth ratio η is a factor by which the bandwidth of an encoded transmission exceeds that of a conventional broadcast of the same presentation. This is a measure of the cost to the broadcaster. The time ratio T/τ is the factor by which the presentation length T exceeds the wait time τ, and is therefore a measure of the benefit to the viewer. The graph of FIG. 21 illustrates the relationship of these two ratios for three cases, near-video-on-demand (curve 42), pyramid broadcasting as described in the previously cited references (curve 44), and the present invention (curve 46). As can be seen, for near-video-on-demand the time ratio is linear in the bandwidth ratio. Pyramid broadcasting provides improved results. For example, a bandwidth ratio of 10 has a time ratio of 62, and a bandwidth ratio of 16 has a time ratio of 248. In the present invention, a bandwidth ratio in the range of 6-8 provides a time ratio of 400-3000, e.g. two-to-twelve second wait times for a two-hour presentation.

The features of the present invention can be combined with other known techniques to provide additional enhancements. For instance, the previously described approach, in which the beginning portions of movies are stored ahead of time at the subscriber's premises for instant retrieval, can be employed in conjunction with the invention to eliminate the wait time τ altogether. In this case, however, only a very small portion of the movie needs to be preliminarily stored at the subscriber's premises, e.g. 7.5 seconds for a two-hour movie, thereby significantly reducing the local storage requirements per movie. As an alternative, material which is common to several presentations, such as a copyright warning, a rating announcement, a studio logo, or an advertisement, can be locally stored and played during the initial τ seconds, to eliminate the perception of any waiting time.

It will be appreciated by those of ordinary skill in the art that the present invention can be embodied in other specific forms without departing from the spirit or essential characteristics thereof. For instance, the foregoing examples of the invention have been described for the cases in which each segment contains the maximum integral number of fragments that fit within the repetition period of the segment. In this case, in order to ensure that each fragment arrives at the subscriber's premises within the required time, the fragments are transmitted in the same sequence within each fragment. However, if it is desirable to be able to reorder the fragments from one segment to the next, it is possible to transmit less than the maximum number of fragments within the period of a segment. In this case, the extra space that is available within the segment can be used to reorder the fragments, e.g. transmit a given fragment before it is required, while still preserving the time guarantees.

Similarly, while the use of equal-size fragments has been described in the foregoing examples, particularly to facilitate the multiplexing of the substreams, other embodiments of the invention might employ fragments of varying sizes, for instance where the substreams are transmitted independently of one another, in parallel.

Furthermore, while the foregoing embodiments of the invention have been specifically described with reference to their application to televised movies, it will be appreciated that the principles which underlie the invention can be applied to any type of temporally-ordered data that is distributed via a broadcast or multicast medium. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

We claim:

1. A computer readable storage device storing computer executable instructions that when executed by a computer perform a method for delivering streaming digital media, the method comprising:
   dividing, using a processor, the streaming digital media into a sequence of segments;
   dividing, using the processor, the sequence of segments into successive fragments,
      wherein the streaming digital media includes video or audio program data;
   assigning a nominal transmission time for each fragment within a segment,
      wherein the nominal transmission time is based on a time interval that is a function of a length of the segment and the number of fragments in the segment;
   sorting the fragments in accordance with the nominal transmission time assigned for each fragment; and
   transmitting the successive fragments in the sorted order at a fixed data rate,
      wherein the fixed data rate is based on a harmonic mean of the time intervals for the segments,
      wherein a time between transmission of each of the successive fragments is equal to the harmonic mean of the time intervals for the segments, and
      wherein the successive fragments are delivered for replaying the video or audio program data.

2. The method of claim 1 wherein a given segment of the successive fragments is transmitted over a period of time equal to the presentation time of all previous segments plus a predetermined wait period.

3. The method of claim 1, further comprising deleting one or more fragments in at least one segment.

4. The method of claim 1 wherein transmitting the successive fragments includes transmitting the successive fragments in a manner that ensures a maximum wait period τ before one or more televisions or display devices can commence displaying the media.

5. The method of claim 4 further comprising determining an optimized bandwidth for a given wait period τ, wherein determining an optimized bandwidth includes iteratively repeating a process including 1) calculating locally optimal values for a first subset of segments and 2) calculating locally optimal values for a second subset of segments.

6. A system for delivering streaming digital media, the system comprising:
   means for dividing the streaming digital media into a sequence of segments;
   means for dividing the sequence of segments into successive fragments,
      wherein the streaming digital media includes video or audio program data;
   means for assigning a nominal transmission time for each fragment within a segment,
      wherein the nominal transmission time is based on a time interval that is a function of a length of the segment and the number of fragments in the segment;
   means for sorting the fragments in accordance with the nominal transmission times assigned for each fragment; and
   means for transmitting the successive fragments in the sorted order at a fixed data rate,
      wherein the fixed data rate is based on a harmonic mean of the time intervals for the segments,
      wherein a time between transmission of each of the successive fragments is equal to the harmonic mean of the time intervals for the segments, and
      wherein the successive fragments are delivered for replaying the video or audio program data.

7. The system of claim 6 wherein a given segment of the successive fragments is transmitted over a period of time equal to the presentation time of all previous segments plus a predetermined wait period.

8. The system of claim 6, further comprising means for deleting one or more fragments in at least one segment.

9. The system of claim 6 wherein transmitting the successive fragments includes transmitting the successive fragments in a manner that ensures a maximum wait period $\tau$ before one or more televisions or display devices can commence displaying the media.

10. The system of claim 6 further comprising means for determining an optimized bandwidth for a given wait period $\tau$, wherein determining an optimized bandwidth includes iteratively repeating a process including 1) calculating locally optimal values for a first subset of segments and 2) calculating locally optimal values for a second subset of segments.

11. A method for delivering streaming digital media, the method comprising:
   dividing the streaming digital media into a sequence of segments;
   dividing the sequence of segments into successive fragments, wherein the streaming digital media includes video or audio program data;
   assigning a nominal transmission time for each fragment within a segment,
      wherein the nominal transmission time is based on a time interval that is a function of a length of the segment and the number of fragments in the segment;
   sorting the fragments in accordance with the nominal transmission times assigned for each fragment; and
   transmitting the successive fragments in the sorted order at a fixed data rate,
      wherein the fixed data rate is based on a harmonic mean of the time intervals for the segments,
      wherein a time between transmission of each of the successive fragments is equal to the harmonic mean of the time intervals for the segments, and
      wherein the successive fragments are delivered for replaying the video or audio program data.

12. The method of claim 11 wherein a given segment of the successive fragments is transmitted over a period of time equal to the presentation time of all previous segments plus a predetermined wait period.

13. The method of claim 11, further comprising deleting one or more fragments in at least one segment.

14. The method of claim 11 wherein transmitting the successive fragments includes transmitting the successive fragments in a manner that ensures a maximum wait period $\tau$ before one or more televisions, or display devices can commence displaying the media.

15. The method of claim 11 further comprising determining an optimized bandwidth for a given wait period $\tau$, wherein determining an optimized bandwidth includes iteratively repeating a process including 1) calculating locally optimal values for a first subset of segments and 2) calculating locally optimal values for a second subset of segments.

* * * * *